(12) United States Patent
Imaizumi et al.

(10) Patent No.: US 8,717,644 B2
(45) Date of Patent: May 6, 2014

(54) IMAGE SCANNING DEVICE CAPABLE OF OBTAINING AT HIGH SPEED A SCANNED IMAGE OF HIGH QUALITY AND APPROPRIATE MAGNIFICATION, IMAGE SCANNING METHOD, IMAGE FORMATION APPARATUS, AND RECORDING MEDIUM

(75) Inventors: Shoji Imaizumi, Shinshiro (JP); Takayuki Suzuki, Toyohashi (JP)

(73) Assignee: Konica Minolta, Inc., Tokyo (JP)

( * ) Notice: Subject to any disclaimer, the term of this patent is extended or adjusted under 35 U.S.C. 154(b) by 437 days.

(21) Appl. No.: 13/033,345

(22) Filed: Feb. 23, 2011

(65) Prior Publication Data

US 2011/0205604 A1  Aug. 25, 2011

(30) Foreign Application Priority Data

Feb. 25, 2010 (JP) .................. 2010-040620

(51) Int. Cl.
*H04N 1/04* (2006.01)

(52) U.S. Cl.
USPC ............ 358/498; 358/1.9; 358/3.12; 358/474

(58) Field of Classification Search
CPC . H04N 1/00; H04N 1/00652; H04N 1/00657; H04N 1/00793; H04N 1/172201; H04N 2201/0454; H04N 2201/3335
USPC ................................................. 358/474–498
See application file for complete search history.

(56) References Cited

U.S. PATENT DOCUMENTS

| 7,755,812 | B2 | 7/2010 | Oshida et al. | |
|---|---|---|---|---|
| 2008/0068681 | A1 * | 3/2008 | Ishido | 358/498 |
| 2008/0252926 | A1 * | 10/2008 | Minamino | 358/1.15 |
| 2009/0122365 | A1 * | 5/2009 | Noda et al. | 358/498 |

FOREIGN PATENT DOCUMENTS

| JP | 2003-264671 | 9/2003 |
|---|---|---|
| JP | 2006-115134 | 4/2006 |
| JP | 2006-245927 | 9/2006 |
| JP | 2006-270822 | 10/2006 |
| JP | 2008-104165 | 5/2008 |

OTHER PUBLICATIONS

Extended Search Report dated May 3, 2012, directed to European Application No. 11155581.9; 8 pages.
Notice of Grounds of Rejection mailed Jan. 10, 2012, directed to Japanese Application No. 2010-040620; 7 pages.

* cited by examiner

*Primary Examiner* — Benny Q Tieu
*Assistant Examiner* — Marcellus Augustin
(74) *Attorney, Agent, or Firm* — Morrison & Foerster LLP

(57) ABSTRACT

An image scanning device includes a first scanner scanning a top side of a transported document at a first scanning position to obtain a first scanned image, a second scanner scanning the back side of the transported document at a second scanning position to obtain a second scanned image, a document feeder transporting a document at the second scanning position at a speed differing from the transportation speed at the first scanning position, and a controller controlling the image scanning device. The controller sets, as a scanning form of a document, either one-side scanning of scanning one side of a document through one transportation, or dual-side scanning of scanning both sides of a document through one transportation. The controller also obtains a set magnification. The controller determines the transportation speed by the document feeder such that, when one-side scanning is set, the scanning magnification in a first direction corresponding to the document transportation direction at the first scanned image attains the set magnification, and when dual-side scanning is set, the scanning magnification in the first direction at the second scanned image attains the set magnification.

16 Claims, 24 Drawing Sheets

FIG.7A

| | R1 | R2 | R3 |
|---|---|---|---|
| SPEED RATIO | 1 | 1.004 | 1.008 |
| BETWEEN R1-R2 | 100mm | | — |
| BETWEEN R2-R3 | — | 30mm | |

FIG.7B

| DOCUMENT SIZE | DOCUMENT LENGTH VIEWED FROM TOP SIDE (mm) | DISTANCE SHIFTED BY R1 SPEED | DISTANCE SHIFTED BY R2 SPEED | DISTANCE SHIFTED BY R3 SPEED | BACK SIDE SUBSCANNING LENGTH (mm) | BACK SIDE SUBSCANNING MAGNIFICATION | BACK SIDE SUBSCANNING CORRECTION COEFFICIENT $\varepsilon 0$ REFERENCED TO A4L | RATIO OF BACK SIDE SUBSCANNING MAGNIFICATION REFERENCED TO A4L | SIZE DEPENDENT CORRECTION COEFFICIENT $\alpha$ | MACHINERY DIFFERENCE COEFFICIENT $\beta$ |
|---|---|---|---|---|---|---|---|---|---|---|
| A3 | 420 | 290 | 100 | 30 | 419.4 | 99.85% | | 100.15% | 99.85% | — |
| A4S | 297 | 167 | 100 | 30 | 296.4 | 99.79% | | 100.09% | 99.91% | — |
| A4L | 210 | 80 | 100 | 30 | 209.4 | 99.70% | 100.3% | 100.00% | 100% | MEASURED RESULT |
| A5S | 149 | 19 | 100 | 30 | 148.4 | 99.57% | | 99.88% | 100.12% | — |
| POST CARD | 105 | 0 | 75 | 30 | 104.5 | 99.49% | | 99.79% | 100.21% | — |

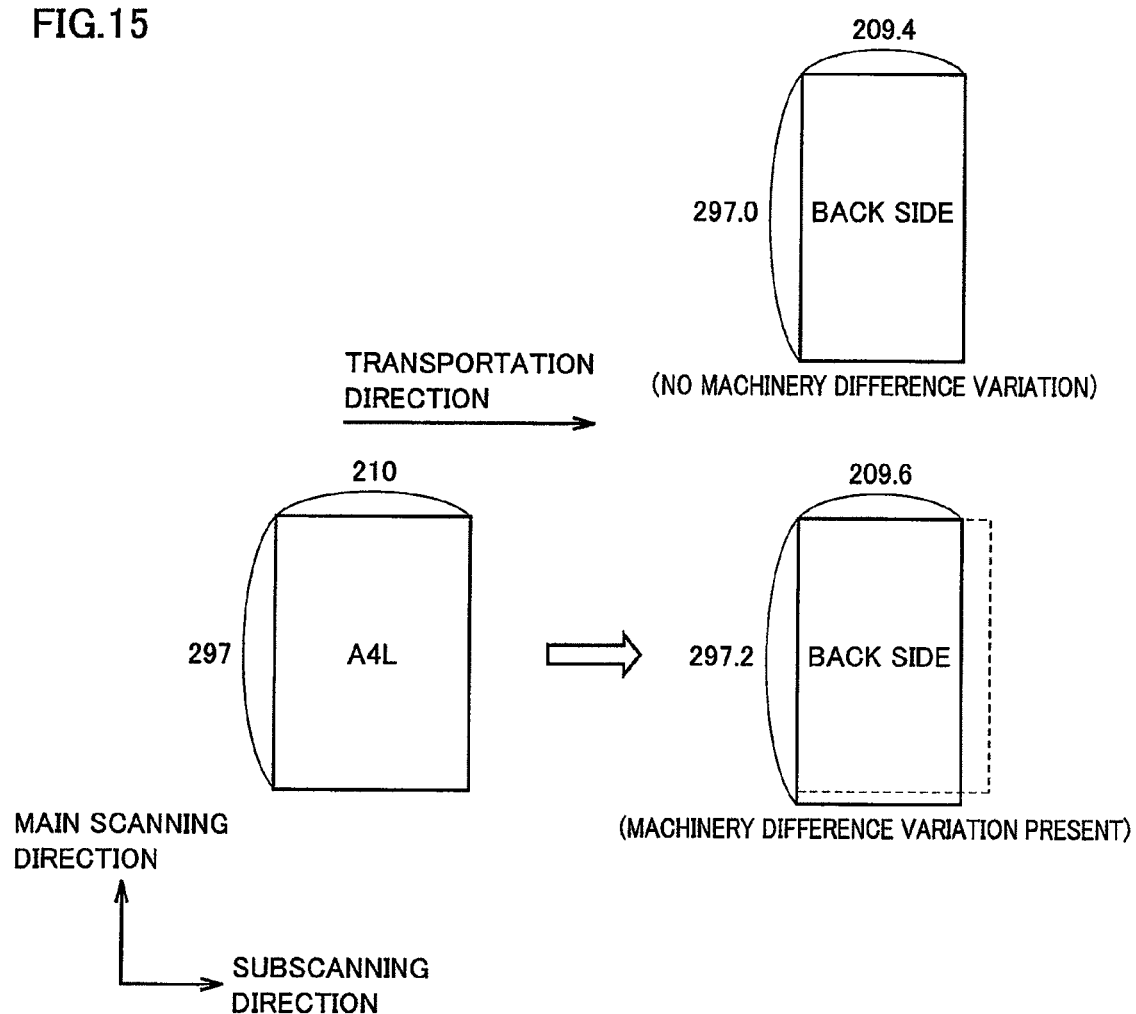

FIG.16A

| MANUAL PLACEMENT CORRECTION COEFFICIENT $\beta$ ||
|---|---|
| MAIN SCAN (LINE MEMORY LENGTH) | $\beta$ (M0) |
| SUBSCAN (TRANSPORTATION SPEED) | $\beta$ (S0) |

FIG.16B

| TOP SIDE CORRECTION COEFFICIENT $\beta$ ||
|---|---|
| MAIN SCAN (LINE MEMORY LENGTH) | $\beta$ (M1) |
| SUBSCAN (TRANSPORTATION SPEED) | $\beta$ (S1) |

FIG.16C

| BACK SIDE CORRECTION COEFFICIENT $\beta$ ||
|---|---|
| MAIN SCAN (LINE MEMORY LENGTH) | $\beta$ (M2) |
| SUBSCAN (TRANSPORTATION SPEED) | $\beta$ (S2) |

FIG.23

| β(S2) \ β(S1) | 99.0% | 99.2% | 99.4% | 99.6% | 99.8% | 100.0% | 100.2% | 100.4% | 100.6% | 100.8% | 101.0% |
|---|---|---|---|---|---|---|---|---|---|---|---|
| 99.0% | 100.0% |  |  |  |  |  |  |  |  |  |  |
| 99.2% | 99.8% | 100.0% |  |  |  |  |  |  |  |  |  |
| 99.4% | 99.6% | 99.8% | 100.0% |  |  |  |  |  |  |  |  |
| 99.6% | 99.4% | 99.6% | 99.8% | 100.0% |  |  |  |  |  |  |  |
| 99.8% | 99.2% | 99.4% | 99.6% | 99.8% | 100.0% |  |  |  |  |  |  |
| 100.0% | 99.0% | 99.2% | 99.4% | 99.6% | 99.8% | 100.0% |  |  |  |  |  |
| 100.2% | 98.8% | 99.0% | 99.2% | 99.4% | 99.6% | 99.8% | 100.0% |  |  |  |  |
| 100.4% | 98.6% | 98.8% | 99.0% | 99.2% | 99.4% | 99.6% | 99.8% | 100.0% |  |  |  |
| 100.6% | 98.4% | 98.6% | 98.8% | 99.0% | 99.2% | 99.4% | 99.6% | 99.8% | 100.0% |  |  |
| 100.8% | 98.2% | 98.4% | 98.6% | 98.8% | 99.0% | 99.2% | 99.4% | 99.6% | 99.8% | 100.0% |  |
| 101.0% | 98.0% | 98.2% | 98.4% | 98.6% | 98.8% | 99.0% | 99.2% | 99.4% | 99.6% | 99.8% | 100.0% |

FIG.24  PRIOR ART
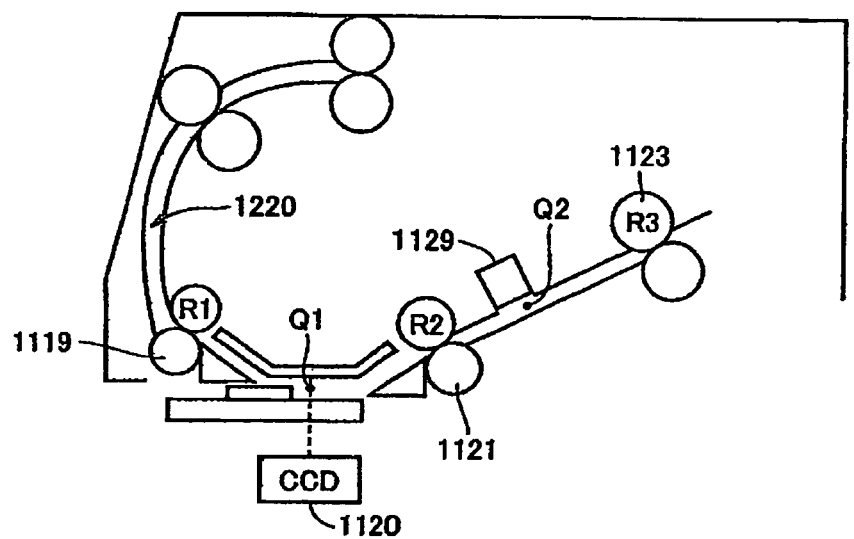

IMAGE SCANNING DEVICE CAPABLE OF OBTAINING AT HIGH SPEED A SCANNED IMAGE OF HIGH QUALITY AND APPROPRIATE MAGNIFICATION, IMAGE SCANNING METHOD, IMAGE FORMATION APPARATUS, AND RECORDING MEDIUM

This application is based on Japanese Patent Application No. 2010-040620 filed with the Japan Patent Office on Feb. 25, 2010, the entire content of which is hereby incorporated by reference.

BACKGROUND OF THE INVENTION

1. Field of the Invention

The present invention relates to an image scanning device having a dual-side scanning function to scan both sides of a document through one transportation such as a digital copy machine, facsimile, and scanner as well as, an image scanning method, an image formation apparatus, and a recording medium.

2. Description of the Related Art

An image scanning device employed as a copy machine or the like is conventionally known to carry out the so-called "skim reading", i.e. scanning an image on a document, having the scanning position by a sensor such as a CCD (Charge Coupled Device) fixed, and delivering a document onto a platen glass, one page at a time, through an automatic document reader, and reading out the light reflected from the document at the scanning position. There is also known a "dual-side scanning" type having two sensors (such as CCD, CIS (Contact Image Sensor)) provided to scan the top side and back side of a document through one transportation to improve the production output, as disclosed in Japanese Laid-Open Patent Publication No. 2006-115134, for example.

FIG. 24 is a diagram to describe a general configuration of an image scanning device capable of dual-side scanning.

Referring to FIG. 24, there is established a transportation path 1220 through which a document is transported inside the image scanning device. A plurality of transportation rollers are provided to carry a document through the transportation path.

Specifically, there are sequentially provided a read roller pair 1119, a read discharge roller pair 1121, and a discharge sheet roller pair 1123 from the upstream side in the document transportation direction of the transportation path. A scanning position Q1 of CCD 1120 is located between read roller pair 1119 and read discharge roller pair 1121. A scanning position Q2 of CIS 1129 is located between read discharge roller pair 1121 and discharge roller pair 1123.

A document carried through transportation path 1220 has the surface (top side) scanned by CCD 1120 at scanning position Q1 and the rear surface (back side) of the document scanned by CIS 1129 at scanning position Q2. Thus, dual-side scanning is executed by scanning both the top side and back side of a document through one transportation.

In order to prevent slacking in the document at the time of passing the scanning position, an image scanning device performing skim reading generally has the document transportation speed by the transportation roller disposed downstream of the scanning position set higher (faster) than the transportation speed by the transportation roller disposed upstream of the scanning position.

The transportation speed by the transportation rollers arranged at the upstream and downstream sides of the scanning position cannot be made to coincide with each other completely due to variation in the fabrication of the transportation rollers, wear of the transportation rollers due to usage, and the like. In order to prevent slacking in a document caused by the transportation speed by the transportation roller located downstream being lower (slower) than the transportation speed by the transportation roller located upstream, the transportation speed of the transportation roller located downstream of the scanning position is designed to be higher than the transportation speed by the transportation roller disposed upstream of the scanning position.

Slacking in the document at the scanning position will lead to degradation in the resolution of the scanned image (occurrence of out-of-focus).

Thus, in the image scanning device of FIG. 24, the transportation speed of a document by read discharge roller pair 1121 located downstream of scanning position Q1 is higher than the transportation speed by read roller pair 1119 located upstream of scanning position Q1 of CCD 1120.

Accordingly, the document will be constantly pulled towards the downstream side at scanning position Q1, whereby slacking in document at scanning position Q1 can be prevented.

Furthermore, the transportation speed of a document by discharge roller pair 1123 located downstream of scanning position Q2 is set higher than the transportation speed of a document by read discharge roller pair 1121 located upstream of scanning position Q2 of CIS 11129. Accordingly, the document will be constantly pulled towards the downstream side also at reader position Q2 to prevent slacking in the document at scanning position Q2.

When the transportation speed by the transportation roller located downstream in the transportation path is set higher than the transportation speed by the transportation roller located upstream in the transportation path, the transportation speed of a document at scanning position Q1 of CCD 1120 will differ from the transportation speed of the document at scanning position P2 of CIS 1129. As a result, in the event of dual-side scanning, there is a problem that the magnification of the scanned image from the topside of the document read out by CCD 1120 will differ from the magnification of the scanned image from the back side of the document read out by CIS 1129.

Specifically, there is a problem that the magnification in the subscanning direction of the scanned image from the back side of the document will become smaller with respect to the magnification in the subscanning direction of the scanned image from the back side of the document.

The aforementioned Japanese Laid-Open Patent Publication No. 2006-115134 does not take into account the fact that the document transportation speed of a document by the transportation roller located at the downstream side in the transportation path is set higher than the transportation speed by the transportation roller located at the upstream side in the transportation path, and cannot address degradation in the resolution caused by slacking in a document at the scanning position.

Japanese Laid-Open Patent Publication No. 2008-104165 discloses a system of correcting the magnification in the subscanning direction by increasing the transportation speed by the roller located at the downstream side higher than the transportation speed by the roller located at the upstream side, and modifying the scanning period in the main scanning direction between the top side and back side of a document (scanning time per one line). Specifically, there is disclosed a system of modifying the scanning period in the main scanning direction using a pulse generator.

The magnification correction system disclosed in the aforementioned Japanese Laid-Open Patent Publication No.

2008-104165 locally modifies the scanning period in the main scanning direction during document scanning. Therefore, the timing control is complicated, and a particular hardware configuration to realize such control is required.

Furthermore, there is a problem of degradation in the image quality. Since the scanning period per one line is modified locally, density variation is generated in the image scanned from the document at the region where the scanning time is switched.

There is also known another magnification correction system that temporarily stores the scanned image of the back side in a memory, and applying a predetermined image processing algorithm on the data to increase the number of lines in the back side scanned image (inflate processing).

However, this system has the problem that the advantage of dual-side scanning for image reading at high speed is degraded since the data of the back side scanned image is temporarily stored in a memory, which had to be read out again to be subjected to image processing.

SUMMARY OF THE INVENTION

In view of the foregoing, an object of the present invention is to provide an image scanning device capable of obtaining at high speed a scanned image of high picture quality and appropriate magnification, an image scanning method, an image formation apparatus, and a recording medium.

An image scanning device according to an aspect of the present invention includes a first scanner scanning a top side of a transported document at a first scanning position to obtain a first scanned image, a second scanner scanning a back side of the transported document at a second scanning position to obtain a second scanned image, a document feeder transporting a document at the second scanning position at a speed differing from the transportation speed at the first scanning position, and a controller controlling the image scanning device. The controller is configured to set, as a document scanning form, one-side scanning of scanning one side of a document through one transportation, or dual-side scanning of scanning both sides of a document through one transportation; obtain the set magnification; and determine the transportation speed of the document feeder such that, when one-side scanning is set, the scanning magnification in a first direction corresponding to the document transportation direction attains the set magnification at the first scanned image, and when dual-side scanning is set, the scanning magnification in the first direction attains the set magnification at the second scanned image.

Preferably, the scanning period of one line in a second direction orthogonal to the first direction corresponding to the document transportation direction at the first scanner is equal to the scanning period of one line in the second direction at the second scanner.

Preferably, the second scanning position is located downstream of the first scanning position in the document transportation direction. The document feeder transports a document such that the transportation speed at the second scanning position is higher than the transportation speed at the first scanning position. The controller is configured to execute, when dual-side scanning is set, an electronic variable scale magnification process of electronic decimation such that the scanning magnification in the first direction attains the set magnification for the first scanned image.

Particularly, the document feeder includes at least a first transportation roller arranged upstream of the first scanning position in the document transportation direction, and a second transportation roller arranged downstream of the first scanning position in the document transportation direction. The transportation speed of a document by the second transportation roller is higher than the transportation speed of a document by the first transportation roller.

Preferably, the controller is configured to determine the transportation speed of the document feeder such that, when dual-side scanning is set, the scanning magnification in the first direction of a second scanned image that varies due to a difference in the document transportation speed between the first scanning position by the first scanner and the second scanning position by the second scanner attains the set magnification.

Preferably, the document includes a plurality of types of documents differing in length in the first direction corresponding to the document transportation direction. The controller is configured to determine the transportation speed by the document feeder such that, when dual-side scanning is set, the scanning magnification in the first direction of a second scanned image that varies due to the length of each document attains the set magnification.

Preferably, the document includes a plurality of types of documents differing in thickness. The controller is configured to determine the transportation speed by the document feeder such that, when dual-side scanning is set, the scanning magnification in the first direction of a second scanned image that varies due to the thickness of each document attains the set magnification.

Preferably, the controller is configured to determine the transportation speed by the document feeder, such that, when one-side scanning is set, the scanning magnification in the first direction at the first scanned image that varies due to machinery difference variation at the first scanner attains the set magnification, and to determine the transportation speed by the document feeder such that, when the dual-side scanning is set, the scanning magnification in the first direction at the second scanned image that varies due to a difference in the document transportation speed between the first scanning position by the first scanner and the second scanning position by the second scanner, and machinery difference variation at the second scanner attains the set magnification.

Particularly, the second scanning position is arranged downstream of the first scanning position in the document transportation direction. The document feeder transports a document such that the transportation speed at the second scanning position is higher than the transportation speed at the first scanning position. The controller is configured to execute electronic variable scale magnification process of electronic decimation such that the scanning magnification in the first direction for the first scanned image attains the set magnification when dual-side scanning is set. The electronic variable scale magnification process is equivalent to comparing the scanning magnification in the first direction at the first scanned image that varies due to machinery difference variation at the first scanner with the scanning magnification in the first direction at the second scanned image that varies due to a difference in the document transportation speed at the first scanning position by the first scanner and the second scanning position by the second scanner, and machinery difference variation at the second scanner, and performing the electronic decimation based on a result of comparison.

Preferably, the first scanner is a CCD (Charge Coupled Device). The second scanner is a CIS (Contact Image Sensor).

An image formation apparatus according to an aspect of the present invention includes an image scanning device, and a printer that can print out an image obtained by the image scanning device. The image scanning device includes a first scanner scanning a top side of a transported document at a first scanning position to obtain a first scanned image, a second scanner scanning a back side of the transported document at a second scanning position to obtain a second scanned image, a document feeder transporting a document at the second scanning position at a speed differing from the transportation speed at the first scanning position, and a controller controlling the image scanning device. The controller is configured to set, as a document scanning form, one-side scanning of scanning one side of a document through one transportation, or dual-side scanning of scanning both sides of a document through one transportation; obtain the set magnification; and determine the transportation speed of the document feeder such that, when one-side scanning is set, the scanning magnification in a first direction corresponding to the document transportation direction attains the set magnification at the first scanned image, and when dual-side scanning is set, the scanning magnification in the first direction attains the set magnification at the second scanned image.

An image scanning method according to an aspect of the present invention is an image scanning method of an image scanning device including a first scanner scanning a top side of a transported document at a first scanning position to obtain a first scanned image, a second scanner scanning a back side of the transported document at a second scanning position to obtain a second scanned image, and a document feeder transporting a document at the second scanning position at a speed differing from the transportation speed at the first scanning position. The image scanning method includes the steps of: accepting entry of a setting of whether a scanning form of a document is one-side scanning of scanning one side of a document through one transportation, or dual-side scanning of scanning both sides of a document through one transportation; obtaining a set magnification, and determining a transportation speed of the document feeder. The step of determining the transportation speed of the document feeder includes the steps of determining the transportation speed by the document feeder such that the scanning magnification in the first direction corresponding to a document transportation direction attains the set magnification at the first scanned image, when one-side scanning is set; and determining the transportation speed by the document feeder such that the scanning magnification in the first direction at the second scanned image attains the set magnification when dual-side scanning is set.

Preferably, the scanning period of one line in a second direction orthogonal to the first direction corresponding to the document transportation direction at the first scanner is equal to the scanning period of one line in the second direction at the second scanner.

Preferably, the second scanning position is located downstream of the first scanning position in the document transportation direction. The document feeder transports a document such that the transportation speed at the second scanning position is higher than the transportation speed at the first scanning position. The method further includes the step of performing electronic decimation such that the scanning magnification in the first direction attains the set magnification for the first scanned image, when dual-side scanning is set.

Particularly, the document feeder includes at least a first transportation roller arranged upstream of the first scanning position in the document transportation direction, and a second transportation roller arranged downstream of the first scanning position in the document transportation direction. The transportation speed of a document by the second transportation roller is higher than the transportation speed of a document by the first transportation roller.

A recording medium according to an aspect of the present invention is a computer readable recording medium of an image scanning device including a first scanner scanning a top side of a transported document at a first scanning position to obtain a first scanned image, a second scanner scanning a back side of the transported document at a second scanning position to obtain a second scanned image, and a document feeder transporting a document at the second scanning position at a speed differing from the transportation speed at the first scanning position. A control program stored in the recording medium causes a computer to execute a process including the steps of: accepting entry of a setting of whether a scanning form of a document is one-side scanning of scanning one side of a document through one transportation, or dual-side scanning of scanning both sides of a document through one transportation; obtaining a set magnification; and determining a transportation speed of the document feeder. The control program causes the computer to execute a process including, as the step of determining the transportation speed of the document feeder, the steps of determining the transportation speed by the document feeder such that the scanning magnification in the first direction corresponding to a document transportation direction attains the set magnification at the first scanned image, when one-side scanning is set; and determining the transportation speed by the document feeder such that the scanning magnification in the first direction at the second scanned image attains the set magnification, when dual-side scanning is set.

Preferably, the scanning period of one line in a second direction orthogonal to the first direction corresponding to the document transportation direction at the first scanner is equal to the scanning period of one line in the second direction at the second scanner.

Preferably, the second scanning position is located downstream of the first scanning position in the document transportation direction. The document feeder transports a document such that the transportation speed at the second scanning position is higher than the transportation speed at the first scanning position. The control program causes the computer to execute a process further including the step of performing electronic decimation such that the scanning magnification in the first direction attains the set magnification for the first scanned image, when dual-side scanning is set.

Particularly, the document feeder includes at least a first transportation roller arranged upstream of the first scanning position in the document transportation direction, and a second transportation roller arranged downstream of the first scanning position in the document transportation direction. The transportation speed of a document by the second transportation roller is higher than the transportation speed of a document by the first transportation roller.

The foregoing and other objects, features, aspects and advantages of the present invention will become more apparent from the following detailed description of the present invention when taken in conjunction with the accompanying drawings.

BRIEF DESCRIPTION OF THE DRAWINGS

FIGS. 7A and 7B are diagrams for describing deviation in the subscanning magnification caused by a difference in the transportation speed between transportation rollers, and a correction coefficient for correcting the deviation at an MFP.

FIG. 15 shows an example of a scanned image of a test chart scanned at step S32 in the flowchart of FIG. 14.

FIGS. 16A, 16B, and 16C are diagrams for describing a correction coefficient registered in a ROM according to a setting process of parameters on shipment shown in FIG. 10.

FIG. 23 is a diagram for describing the ratio of top side subscanning correction coefficient β (S1) to back side subscanning correction coefficient β (S2).

FIG. 24 is a diagram for describing a general configuration of an image scanning device capable of dual-side scanning.

DESCRIPTION OF THE PREFERRED EMBODIMENTS

Figure 1:
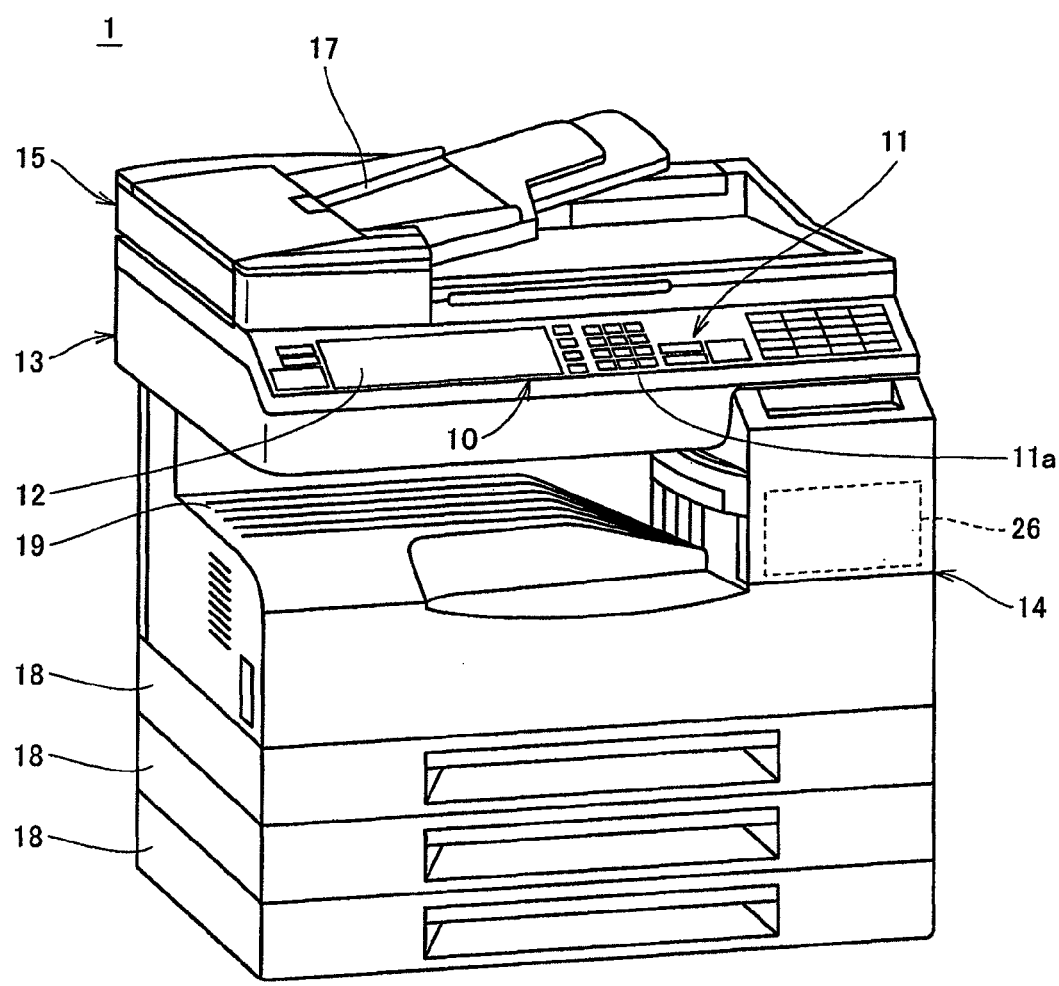
FIG. 1 represents an outer appearance of an MFP (Multi Function Peripheral) as an image scanning device according to an embodiment of the present invention.

Embodiments of the present invention will be described hereinafter with reference to the drawings. In the description, the same components and elements have the same reference character allotted. Their designation and function are also identical.

[MFP Overall Configuration]

An MFP 1 identified as an image scanning device according to an embodiment of the present invention will be described hereinafter based on FIG. 1.

Referring to FIG. 1, MFP 1 of the present embodiment is a digital multi function machine having a copy function, scanner function, facsimile function, and the like.

MFP 1 includes an operation panel 10 that will be described afterwards. Operation panel 10 includes a plurality of keys 11a, an operation unit 11 receiving entry of various instructions by a user's manipulation on relevant key 11a as well as accepting entry of data such as a character or numeric, and a display 12 formed of liquid crystal for providing a display of an instruction menu for a user and/or information related to the obtained image.

MFP 1 includes a scanner 13 optically scanning a document to obtain image data, and a printer 14 printing out an image on a recording sheet based on the scanned image.

At the top surface of the main body of MFP 1, there is arranged an automatic document transportation device (also referred to as ADF (automatic document feeder)) 15 delivering a document placed on document tray 17 to scanner 13. At the lower portion of the main body of MFP 1, a sheet feed unit 18 supplying a recording sheet to printer 14 is arranged. At the middle region, a tray 19 on which is discharged a recording sheet having an image printed by printer 14 is arranged.

Inside the main body of MFP 1 is provided a storage unit 26 or the like storing required data such as a control program used at relevant elements for control of the main body, image data (scanned image), various parameters.

A hardware configuration of MFP 1 according to an embodiment of the present invention will be described based on FIG. 2.

Figure 2:
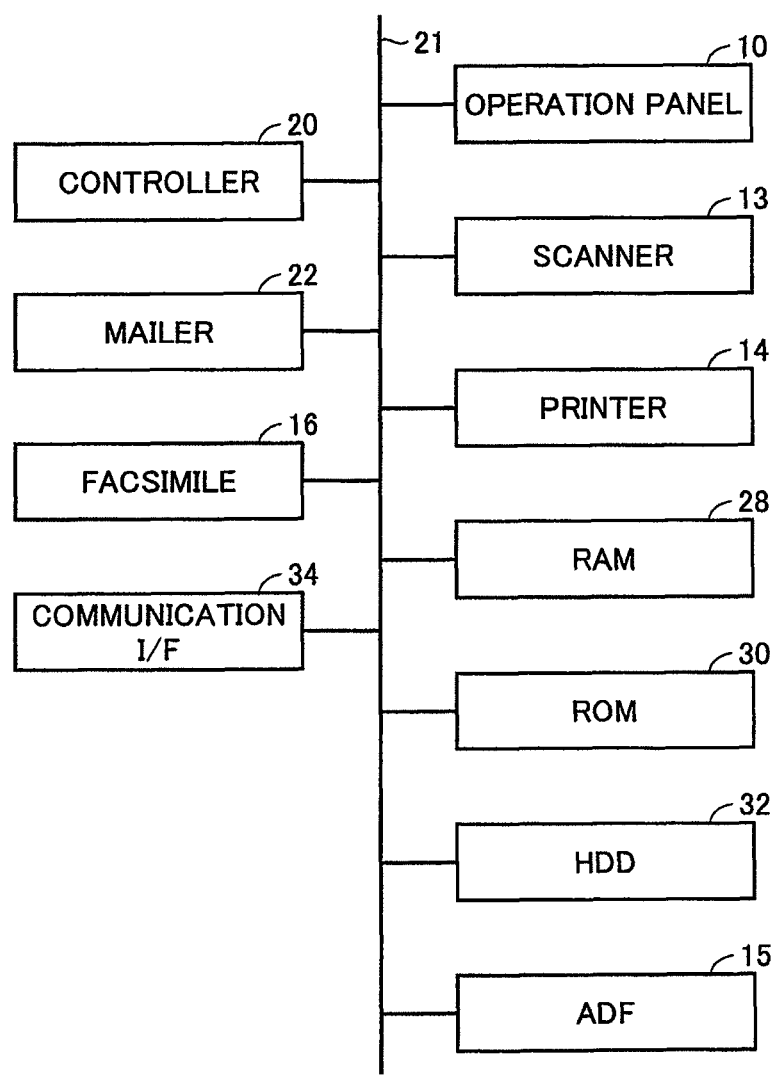
FIG. 2 is a diagram for describing a hardware configuration of an MFP according to an embodiment of the present invention.

Referring to FIG. 2, MFP 1 of the present embodiment includes scanner 13 for converting an original of a paper medium or the like into image data (electronic data), a printer 14 for executing a printing process, a mailer 22 for executing transmission and reception of electronic mail (also referred to as "E-mail"), a facsimile 16 for execution of data transmission utilizing a public line, a communication interface (I/F) 34, operation panel 10 for execution of a designated instruction such as an entry, a ROM (Read Only Memory) 30 storing a control program, various parameter, and the like, a RAM (Random Access Memory) 28 used as a work area for execution of a control process at control unit 20 and the like, an HDD (Hard Disk Drive) 32 storing various information registered at MFP 1, a controller 20 for overall control of MFP 1, and ADF 15 that is transportation means for transporting a document to scanner 13. It is assumed that controller 20 is formed of a central processing unit (CPU). ROM 30, RAM 28 and HDD 32 constitute storage unit 26.

Each element is connected to controller 20 via an internal bus 21. Controller 20 can transmit and receive data to/from each element.

ADF 15 transports a document placed on document tray 17 to the glass plate of scanner 13.

Scanner 13 includes a photosensor formed of a plurality of photoelectric conversion elements (light receiving elements). The photosensor optically scans out image information such as a picture, text, pictorial image and the like from the document via the glass plate to obtain image data. By way of example, the present embodiment will be described based on including two photosensors, i.e. CCD (Charge coupled device) and CIS (contact image sensor), as the photosensor obtaining image data (also referred to as "scanned image"). The obtained scanned image is converted into digital data, subjected to various well-known image processing, and then temporarily stored in RAM 28 to be subsequently transmitted to printer 14 and the like for image printing and/or data storage.

Printer 14 prints out an image on a recording sheet stored in sheet feed unit 18, based on a scanned image obtained by scanner 13 and the like.

Mailer 22 transmits and receives electronic mail to/from a mail server or the like connected via a network not shown.

Facsimile 16 transmits the scanned image obtained by scanner 13 or the like to another facsimile device according to a predetermined protocol.

Communication OF 34 is an interface for connecting each element in MFP 1 with an external apparatus or the like connected on the network not shown. Communication OF 34 is connected to a network through wire or wirelessly to execute transmission/reception of data with another MFP or personal computer (PC). A LAN (Local Area Network), a WAN (Wide Area Network) and the like are envisaged as the network.

Display 12 at operation panel 10 includes a liquid crystal display (LCD) and a touch panel. The LCD provides display of various modes, and the touch panel accepts various settings according to the displayed contents. Operation unit 11 is used for various entry by the user. These function as the main part of the user interface.

A configuration of operation panel 10 will be described based on FIG. 3.

Figure 3:
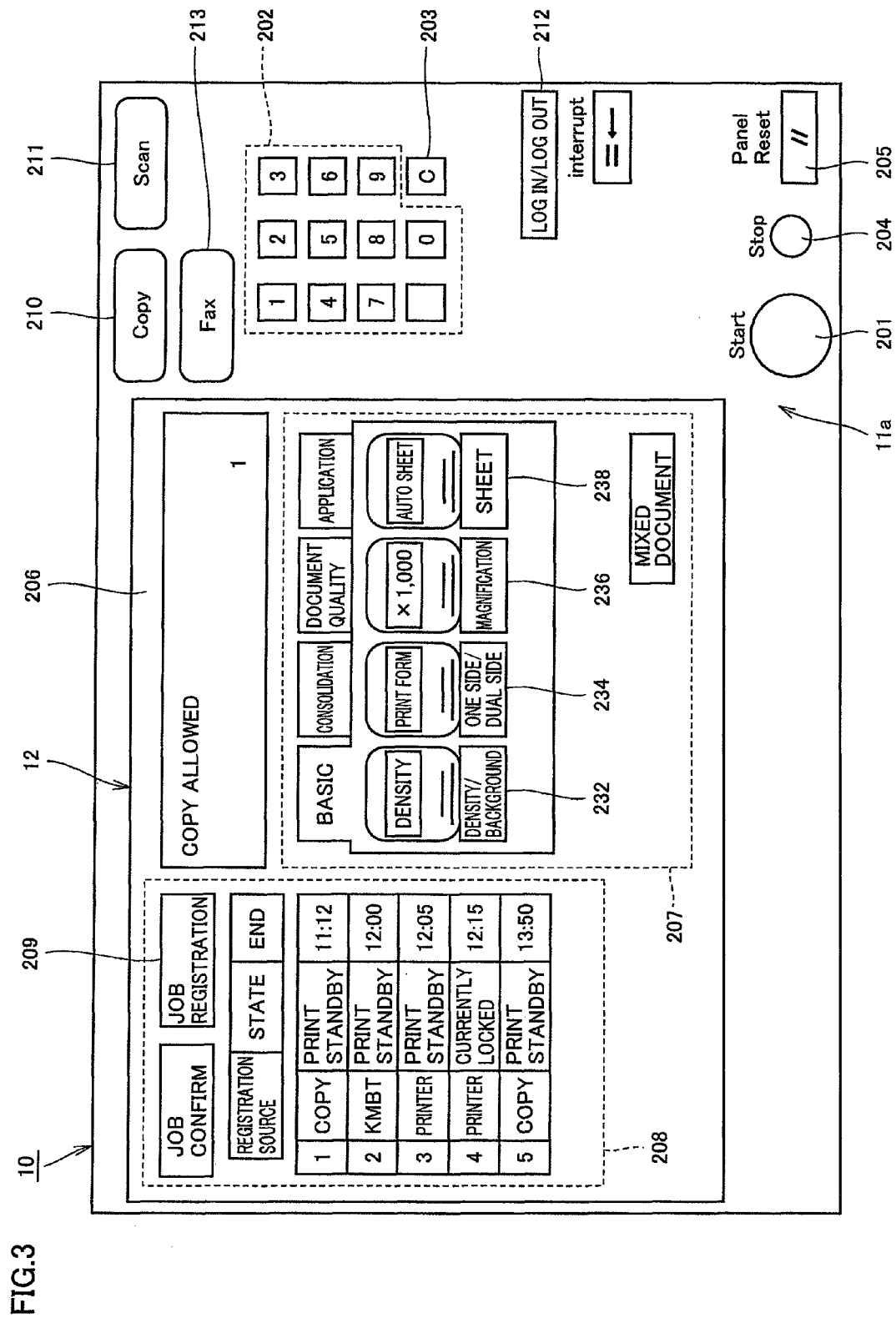
FIG. 3 is a diagram for describing a configuration of an operation panel.

Referring to FIG. 3, a plurality of keys 11a and display 12 are provided at operation panel 10. The user can look at the display of an instruction menu for the user and/or information related to the obtained image on display 12 to enter various instructions and/or data of characters, numeric, and the like by operating key 11a.

A start key 201 is used to start an operation of copy/scan or the like. A ten key 202 is used to enter a numeric such as the number of required copies. A clear key 203 is used to clear the entered numeric, and reset the image data stored in storage unit 26.

A stop key 204 is used to designate stopping of a copy/scan operation. A panel reset key 205 is used to reset an operation mode and/or job that is set.

Display 12 has a touch panel 206 provided at the surface for display and the like of various modes. Touch panel 206 allows the user to carry out various settings according to the displayed contents on the display.

Generally, buttons for basic/applicable setting in executing a copy or scanning operation are disposed at setting screen region 207 of touch panel 206. Depression of an appropriate button provides the display of a hierarchy screen for detailed setting thereof.

Specifically, the present embodiment shows the case where a selectable "basic" setting tab, a "consolidation" setting tab, a "document picture quality" setting tab, and an "application" setting tab are arranged.

The present embodiment shows the hierarchy screen of the "basic" setting tab selected state, including a density/background "setting button 232 to adjust the density of the print sheet or the background region, a "one-side/dual-side" setting button 234 to set a document scanning form (one side/dual side) and the printing state (one side/dual side) of the output sheet (printing sheet), a "magnification" setting button 236 to adjust the printing magnification, and a "sheet" setting button 238 to set the sheet size.

For example, selection of "one-side/dual-side" setting button 234 allows the user to set dual-side scanning by setting the document scanning form to "dual-side". When dual-side scanning is selected at MFP 1, dual-side scanning is performed by the CCD and CIS.

Selection of "magnification" setting button 236 allows the user to set the execution of shrinkage/enlargement to the predetermined magnification in association with the document scanning image. Namely, the user can manually set the desired magnification. In the case where "magnification" setting button 236 is not selected, the set magnification of the document scanning image is 1×, i.e. at equal-scale magnification (1,000 times).

Selection of the "consolidation" setting tab by the user allows the scanning of a plurality of documents to be printed out together on one side of a sheet. For example, there are provided a 2-in-1 mode of printing the scanned images of two documents on one side of one sheet, a 4-in-1 mode of printing the scanned images of four documents on one side of one sheet. When the 2-in-1 mode is selected, the magnification to dispose the scanned images of two documents on one side of a sheet is automatically set as the set magnification according to selection of the relevant mode.

In either case of a user manually setting the set magnification or MFP 1 automatically setting the set magnification, the set magnification in the main scanning direction (main scanning set magnification) and the set magnification in the subscanning direction (subscanning set magnification) can be set independently.

A copy key 210 and a scan key 211 are selection keys for setting which in the copy/scan mode MFP 1 is to be operated. In the initial state, it is assumed that copy key 210 is in a selected state as the selection key.

Depression of copy key 210 allows MFP 1 to be used as a copy machine.

At this stage, a display for various settings in association to a copy operation are provided at setting screen region 207 on touch panel 206. When various settings are completed, a copy operation is initiated by depressing start key 201 with a document at a set state on document tray 17.

Depression of scan key 211 causes MFP 1 to function as a scanner.

At this stage, there is provided a display for various settings in association to a scan operation at setting screen region 207 on touch panel 206. When various settings are completed, a scan operation is initiated by depressing start key 201 with a document at a set state on document tray 17.

Likewise with copy key 210 and scan key 211, a facsimile (fax) key 213 is provided. Depression of fax key 213 allows MFP 1 to operate in a facsimile mode. At this stage, there is provided a display for various settings in association to a facsimile operation at setting screen region 207 on touch panel 206. Facsimile transmission is initiated by depressing start key 201 with a document at a set state on document tray 17.

An image formation apparatus including an image scanning device according to an embodiment of the present invention will be described schematically based on FIG. 4.

Figure 4:
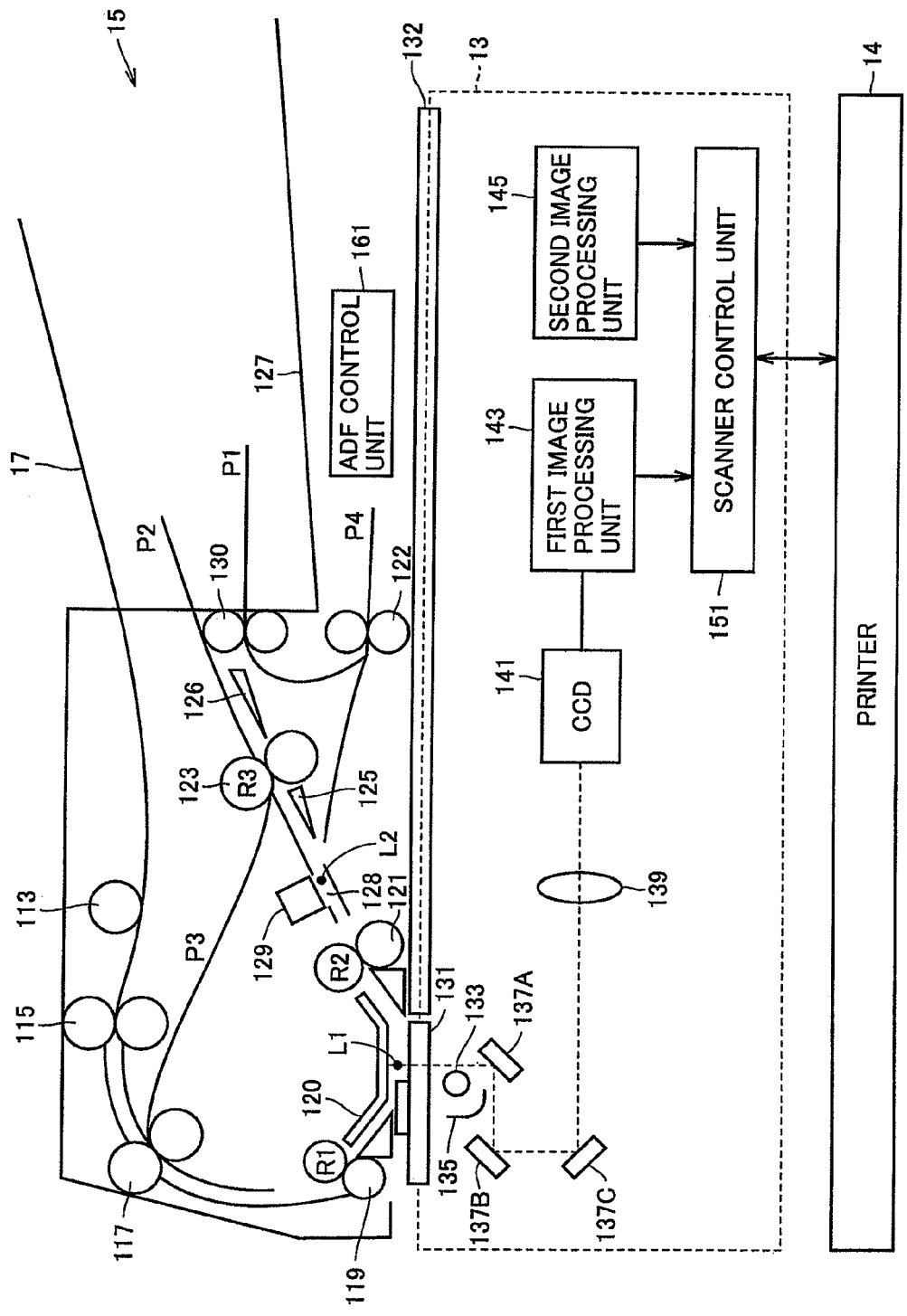
FIG. 4 is a schematic diagram for describing an image formation apparatus including an image scanning device according to an embodiment of the present invention.

Referring to FIG. 4, ADF 15 includes a document tray 17, a sheet feed roller 113, a separation roller 115, a resist roller 117, a read roller pair 1119, a transportation guide member 120, a read discharge roller pair 121, a discharge roller pair 123, a discharge sheet roller pair 130, an inversion discharge roller pair 122, a discharge sheet tray 127, discharge sheet/inversion switching units 125 and 126, a CIS 129, and an ADF control unit 161 for overall control of ADF 15. ADF 15 and scanner 13 constitute an image scanning device.

Scanner 13 includes a glass plate 131 formed of a transparent member, a platen glass 132, a light source 133 to direct light, a reflection member 135 for reflecting light of the light source, a CCD 141 having three line sensors corresponding to red (R), green (G) and blue (B) in the subscanning direction, reflection mirrors 137A, 137B and 137C for guiding the light reflected from a document to CCD 141, a lens 139 for forming an image on CCD 141 based on the light reflected at reflection mirror 137C, a first image processing unit 143 for processing image data output from CCD 141, a second image processing unit 145 for processing image data output from CIS 129, and a scanner control unit 151 for overall control of scanner 13.

Printer 14 executes an image formation process on the image data input from first and second image processing units 143 and 145 via scanner control unit 151 to print out the input image data in accordance with the predetermined printing mode onto a print sheet.

ADF control unit 161 controls the drive of a motor serving as the motive source for rotating sheet feed roller 113, separation roller 115, resist roller 117, read roller pair 119, read discharge roller pair 121, discharge roller pair 123, inversion discharge roller pair 122, and discharge sheet roller pair 130. ADF control unit 161 also executes control of discharge sheet/inversion switching units 125 and 126 for executing control of discharge (output) and inversion of a document.

Sheet feed roller 113 separates the topmost document from the plurality of documents placed on document tray 17 to deliver the document to separation roller 115. Separation roller 115 and resist roller 117 transport the document to read roller pair 119. Read roller pair 119 sends the document via transportation guide member 120 to a first scanning position L1 of scanner 13 on glass plate 131.

The document passing through first scanning position L1 arrives at read discharge roller pair 121 to be delivered to second scanning position L2.

The document through read discharge roller pair 121 passes through second scanning position L2 of CIS 129 to be guided by discharge roller pair 123 towards discharge sheet roller pair 130. The document passed through discharge sheet roller pair 130 is output onto discharge sheet tray 127 from transportation path P1 to be stacked.

In the present example, the transportation path can be switched according to the switching of discharge sheet/inversion switching units 125 and 126. One end of a document is directed from discharge roller pair 123 in the direction of transportation path P2, and then may be guided towards resist roller 117 through discharge roller pair 123 again via transportation path P3. In this case, the document is guided to resist roller 117 in an inverted state as compared to the previous state guided by resist roller 117, and can be transported to the first and second scanning positions. The document transported to the first and second scanning positions, now in an inverted state, has one end guided from read discharge roller pair 121 in the direction of transportation path P4 according to the switching of discharge sheet/inversion switching units 125 and 126, allowing output from transportation path P1 onto discharge sheet tray 127 by inversion discharge roller pair 122 and discharge sheet roller pair 130. By the relevant scheme, an inverted document returns to the former state, and is guided onto discharge sheet tray 127 from discharge sheet roller pair 130.

Switching of the transportation path through switching of discharge sheet/inversion switching units 125 and 126 described above is not essential. A configuration absent of discharge sheet/inversion switching units 125 and 126 and inversion discharge roller pair 122 is allowed.

CCD 141 includes, as a line sensor, a non-contact type photoelectric conversion element arranged in a plurality of rows in the main scanning directions that is substantially perpendicular to the document transportation direction. It is assumed that CCD 141 corresponds to the scanning resolution of 600 dpi, by way of example, in the present embodiment.

When a document transferred by ADF 15 passes first scanning position L1, CCD 141 optically scans the document image by the line sensor, and provides photoelectric-converted image data to first image processing unit 43.

CIS 129 includes, as a line sensor, a contact type photoelectric conversion element arranged in a plurality of rows in a main scanning direction substantially perpendicular to the document transportation direction. In the present embodiment, it is assumed that CIS 129 corresponds to the scanning resolution of 600 dpi, by way of example.

It is also assumed that the scanning period in the main scanning direction of CIS 129 (scanning time of one line) is identical to the scanning period in the main scanning direction of CCD 141. Therefore, when the document transportation speed at first scanning position L1 is equal to the document transportation speed at second scanning position L2, the scanning magnification in the subscanning direction by CCD 141 is equal to the scanning magnification in the subscanning direction by CIS 129.

CIS 129 is arranged opposite to an opening 128 provided at the document transportation path to optically scan an image of a document passing through second scanning position L2, and the photoelectric-converted image data is output to second image processing unit 145.

When the dual-side is set as the scanning form at MFP 1, CCD 141 and CIS 129 read out the image from both the top side and back side of the transported document. In other words, dual-side scanning is performed.

When one side is set as the scanning form at MFP 1, CCD 141 scans the image at the surface of a transported document. In other words, one-side scanning is performed.

In the following, read roller pair 119, read discharge roller pair 121, and discharge roller pair 123 are also referred to as transportation rollers R1, R2, and R3, respectively. Further, transportation rollers R1, R2 and R3 are also generically referred simply as "transportation rollers" hereinafter.

In the present example, the scanning scheme of an image on a document transported by means of transportation rollers by ADF 15, i.e. image scanning by skim reading, is also referred to as "ADF scanning".

Scanner 13 can also scan an image of a manually placed document without usage of ADF 15. Specifically, a manually placed document is mounted on platen glass 132. The manually placed document on platen glass 132 can have the image of the document facing platen glass 132 scanned by the movable slider unit being moved across the entire face of platen glass 132. The slider unit includes light source 133, reflection member 135, and reflection mirrors 137A-137C, and the like. By a slider motor 55 (refer to FIG. 5), the slider unit is moved from one end to the other end of platen glass 132.

At CCD 141, the image of a manually placed document, input through the slider unit, is optically read out by a line sensor. The photoelectric-converted image data is output to first image processing unit 43.

In the present example, image scanning of reading out an image of a document that is manually placed, by means of a slider unit, is also referred to as "manual placement scanning".

A function configuration of ADF 15 and scanner 13 will be described based on FIG. 5.

Figure 5:
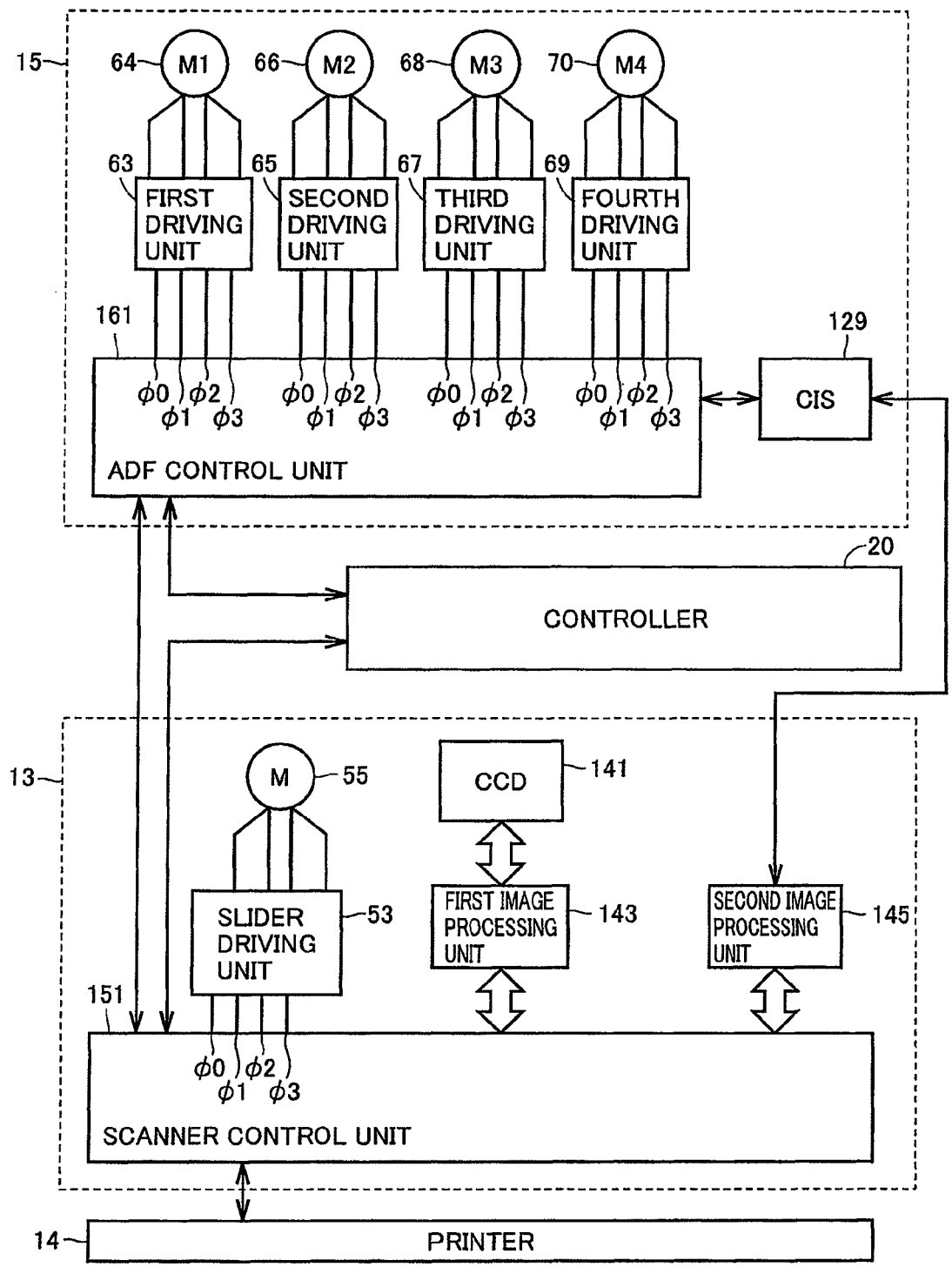
FIG. 5 is a diagram for describing a functional configuration of an ADF and a scanner.

Referring to FIG. 5, ADF 15 includes an ADF control unit 161, first-fourth driving units 63, 65, 67 and 69 each connected to ADF control unit 161, first-fourth pulse motors 64, 66, 68 and 70 connected to first-fourth driving units 63, 65, 67 and 69, respectively, and a CIS 129.

Scanner 13 includes a scanner control unit 151, a slider driving unit 53 connected to scanner control unit 151, a first image processing unit 143, a second image processing unit 145, and a CCD 141 connected to first image processing unit 143.

Scanner control unit 151 and ADF control unit 161 are connected to allow communication with each other. CIS 129 and second image processing unit 145 are connected to allow communication with each other.

Scanner control unit 151 and ADF control unit 161 transfer various control information such as the document size information, operation mode, timing information for scanning a document, and the like through mutual communication.

First to fourth pulse motors 64, 66, 68 and 70 are driven by four excitation signals $\phi 0$-$\phi 3$ output from first to fourth driving units 63, 65, 67 and 69, respectively.

By way of example, sheet feed roller 113, separation roller 115, resist roller 117, read roller pair 119, read discharge roller pair 121, discharge roller pair 123, inversion discharge roller pair 122, and discharge sheet roller pair 130 are driven by any one of first to fourth driving units 63, 65, 67 and 69, having the rotation speed and rotation direction switched independently according to the transportation timing of a document.

Specifically, first pulse motor 64 rotatably drives sheet feed roller 113, separation roller 115, and resist roller 117. Second pulse motor 66 rotatably drives read roller pair 119, read discharge roller pair 121, and discharge roller pair 123. Third pulse motor 68 rotatably drives discharge sheet roller pair 130. Fourth pulse motor 70 rotatably drives inversion discharge roller pair 122. Although the present embodiment has been described for driving a roller pair and the like with four driving units and motors, a further additional driving unit and motor can be provided to control the roller pair.

When ADF scanning is carried out, MFP 1 basically adjusts the scanning magnification in the subscanning direction by altering the document transportation speed (excluding the top side dual-side scanning as will be described afterwards). Control unit 20 controls the drive of first to fourth pulse motors 64, 66, 68 and 70 such that a document is transported at a transportation speed corresponding to the subscanning set magnification.

Specifically, control unit 20 designates the transportation speed for ADF control unit 161. ADF control unit 161 outputs a drive signal ($\phi 0$ to $\phi 3$) to first to fourth driving units 63, 65, 67 and 69 to attain the designated transportation speed. First to fourth driving units 63, 65, 67 and 69 drives first to fourth pulse motors 64, 66, 68 and 70 according to a drive signal ($\phi 0$ to $\phi 3$). First to fourth pulse motors 64, 66, 68, 70 drive the transportation rollers such that the document is transported at a transportation speed corresponding to the subscanning set magnification.

When manual placement scanning is performed, MFP1 adjusts the scanning magnification in the subscanning direction by altering the moving speed of the slider. As such, control unit 20 controls the drive of slider motor 55 such that slider moves at a moving speed corresponding to the subscanning set magnification.

Specifically, control unit 20 designates a moving speed for scanner control unit 151. Scanner control unit 151 outputs a drive signal ($\phi 0$ to $\phi 3$) to slider driving unit 53 so as to attain the designated moving speed. Slider driving unit 53 drives slider motor 55 in response to the driving signal ($\phi 0$ to $\phi 3$). Slider motor 55 moves the slider at a moving speed corresponding to the subscanning set magnification.

First image processing unit 143 receives a scanned image output by CCD 141 scanning a document. First image processing unit 143 applies a predetermined image process on the input scanned image for output to scanner control unit 151. Second image processing unit 145 receives a scanned image output by CIS 129 scanning a document. Second image processing unit 145 applies a predetermined image process on the input scanned image for output to scanner control unit 151.

Scanner control unit 151 outputs the input scanned image to printer 14. Alternatively, the scanned image may be output to a connected computer, memory, or the like via an external interface.

The function of first and second image processing units will be described based on FIG. 6.

Figure 6:
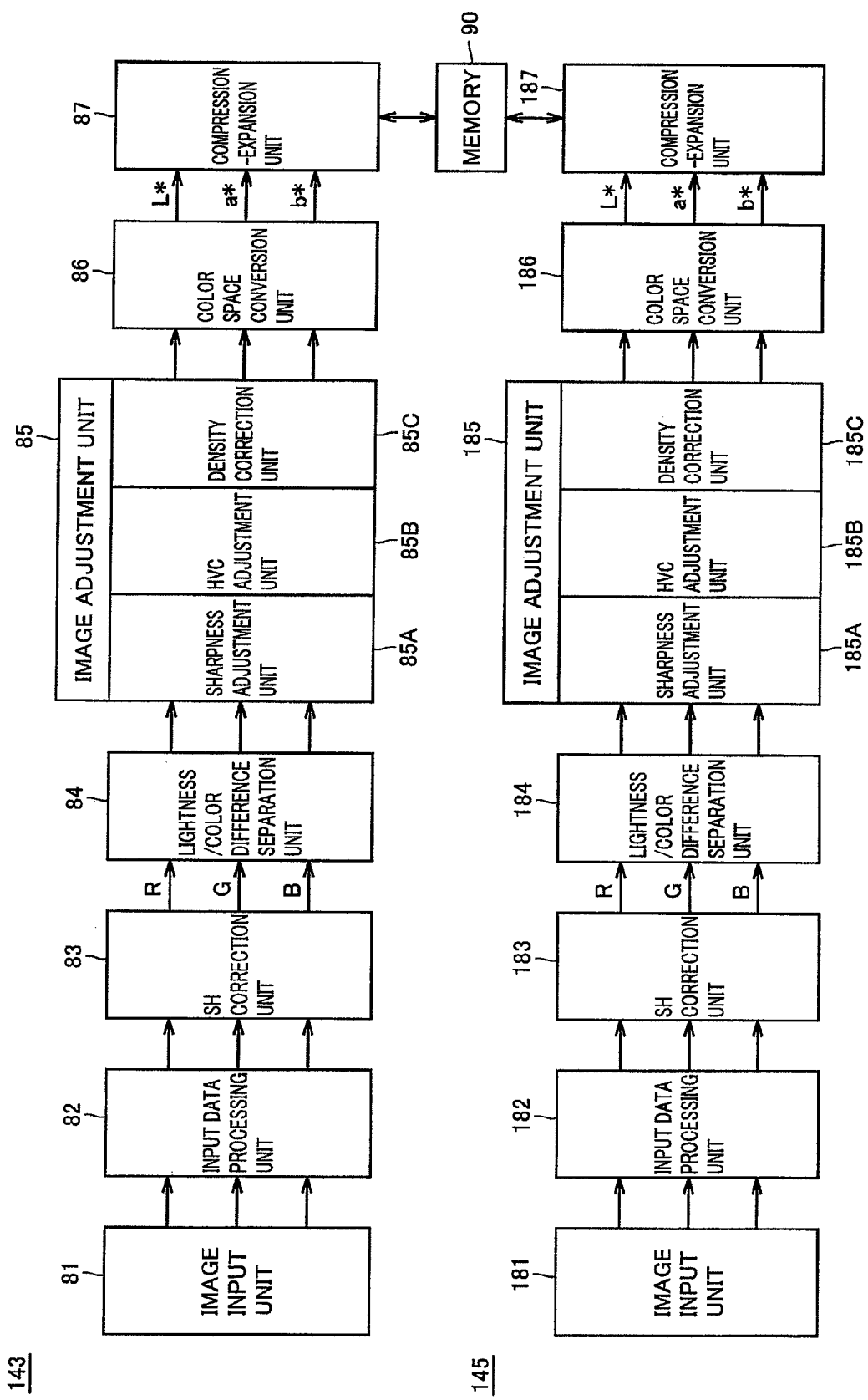
FIG. 6 is a diagram for describing a function of first and second image processing units.

Referring to FIG. 6, first image processing unit 143 includes an image input unit 81, an input data processing unit 82, an SH correction unit 83, and lightness/color difference separation unit 84, an image adjustment unit 85, a color space conversion unit 86, and a compression-expansion unit 87.

Second image processing unit 145 includes an image input unit 181, an input data processor 182, an SH correction unit 183, a lightness/color difference separation unit 184, an image adjustment unit 185, a color space conversion unit 186, and a compression-expansion unit 187.

Since first and second image processing units 143 and 145 are of identical configuration, first image processing unit 143 will be described here.

Image input unit 81 accepts input of image data of each of red (R), green (G) and blue (B) from CCD 141. CCD 141 outputs to image input unit 81 image data (1 scanning line data) corresponding to each of the three line sensors of red (R), green (G) and blue (B). Although image data corresponding to each of the three line sensors of red (R), green (G) and blue (B) is obtained, image data of one line sensor will be mainly described for the sake of simplification.

Input data processing unit 82 converts analog image data input from CCD 141 into digital image data. It is assumed that an electronic variable scale magnification process that will be described afterwards is executed at input data processing unit 82. The electronic variable scale magnification process includes a decimation process in the subscanning direction, and a decimation process/inflate process in the main scanning direction.

SH correction unit 83 applies shading correction on the image data applied from input data processing unit 82. The image data subjected to shading correction is output to lightness/color difference separation unit 84.

Lightness/color difference separation unit 84 separates the image data into lightness (value of color) component and color difference component, each which is output to image adjustment unit 85.

Image adjustment unit 85 includes a sharpness adjustment unit 85A, an HVC adjustment unit 85B, and a density correction unit 85C. Sharpness adjustment unit 85A executes a process of rendering sharp or smooth an image. HVC adjustment unit 85B adjusts the hue (H), value (V) and chroma (C) of an image.

Density correction unit 85C corrects the density of an image. Image adjustment unit 85 outputs the processed image data of each of RGB to color space conversion unit 86.

Color space conversion unit 86 converts the color space of image data from RGB color space to L*a*b* color space, which is provided to compression-expansion unit 87. Compression-expansion unit 87 compresses the image data and stores the compressed image in memory 90 such as a RAM. Compression-expansion unit 87 also expands the compressed image data stored in memory 90 for output to scanner control unit 151.

In dual-side scanning, a scanned image of the top side subjected to image processing by first image processing unit 143 and the scanned image of the back side subjected to image processing by second image processing unit 145 are stored in memory 90. The scanned image of the top side and the scanned image of the back side, read out from memory 90 and expanded, are output to scanner control unit 151. In the following, the scanned image of the top side is also referred to as "top side scanned image", whereas the scanned image of the back side is also referred to as "back side scanned image".

Scanner control unit 151 outputs to printer 14 the scanned image from first image processing unit 143 and second image processing unit 145. At printer 14, dual-side printing, by way of example, is executed.

The setting of the transportation speed of transportation rollers R1-R3 according to an embodiment of the present invention will be described hereinafter based on FIGS. 7A and 7B representing deviation in the subscanning magnification caused by a difference in the transportation speed between transportation rollers, and a correction coefficient for correction of the deviation.

FIG. 7A shows the ratio of the document transportation speed by transportation rollers R1-R3 (speed ratio). The speed ratio of transportation rollers R1-R3 is 1:1.004:1.008. The document transportation speed of a transportation roller is increased as a function of arrangement in the downstream side of the transportation path to avoid occurrence of slacking in a document at first scanning position L1 and second scanning position L2.

The speed ratio of transportation rollers R1-R3 depends upon the outer diameter ratio of transportation rollers R1-R3. Specifically, the rotation speed of each of transportation rollers R1-R3 (the speed for one rotation) is identical. The speed ratio of the document transportation speed is determined according to the outer diameter ratio of each transportation roller.

By setting the same rotation speed for each of transportation rollers R1-R3, transportation rollers R1-R3 can be driven by one motor. Accordingly, the number of components can be reduced. In the present example, it is assumed that transportation rollers R1-R3 are driven by second pulse motor 66, as mentioned above.

The force of moving a document (transportation force) by transportation rollers takes the relationship of transportation roller R1>transportation roller R2>transportation roller R3. Since the transportation roller with the highest transportation force is dominant in the state where a document is transported by two or more transportation rollers, the document is transported at the transportation speed of the transportation roller having the highest document transportation force.

The position of a document in the transportation path and the transportation speed of a document will be described hereinafter with reference to FIG. 4.

When the leading edge of a document reaches transportation roller R1, the document is transported by the transportation speed of transportation roller R1.

When the leading edge of the document reaches transportation roller R2, forming contact with both of transportation rollers R1 and R2, the document will be continued to be delivered at the transportation speed of transportation roller R1 since the transportation force of transportation roller R1 is greater than that of transportation roller R1. When the leading edge of the document reaches transportation roller R3, the document forms contact with transportation rollers R1, R2 and R3. Since the transportation force of transportation roller R1 is the highest thereof, the document will continuously be transported at the transportation speed of transportation roller R1.

When the trailing edge of the document leaves transportation roller R1, the document attains a state forming contact with transportation rollers R2 and R3. Therefore, the document is transported at the transportation speed of transportation roller R2 that has the higher transportation force. When the trailing edge of the document leaves transportation roller R2, the document forms contact with only transportation roller R3. Therefore, the document is transported at the transportation speed of transportation roller R3 until the trailing edge of the document leaves transportation roller R3.

Thus, in the case where a document of a predetermined size is scanned, the document transportation speed (average value) at second scanning position L2 of CIS 129 will be faster by a predetermined speed with respect to the document transportation speed (average value) at first scanning position L1 of CCD 141. Namely, there is a difference in the document transportation speed between first scanning position L1 and second scanning position L2.

As shown in FIG. 7A, transportation rollers R1, R2 and R3 are arranged such that the distance between transportation rollers R1 and R2 and the distance between transportation rollers R2 and R3 in the transportation path are 100 mm, and 30 mm, respectively.

In the following, scanning one side of a document by ADF scanning is referred to as ADF one-side scanning, whereas scanning both sides by ADF scanning is referred to as dual-side scanning. Although one side of a document is scanned in the above-described manual placement scanning mode and ADF one-side scanning mode, they will be differentiated by referring to the former as "manual placement scanning" and the latter as "ADF one-side scanning".

<ADF One-Side Scanning>

First, the transportation speed of transportation rollers in ADF one-side scanning will be described. It is assumed that the main scanning set magnification and subscanning set magnification are equal, i.e. 1×(1.000 times), unless stated otherwise.

In the event of ADF one-side scanning, the scanning magnification in the subscanning direction is adjusted by altering the document transportation speed. The scanning period (Ta) per one line in the main scanning direction of CCD 141 is a fixed value (constant). Therefore, in order to achieve the same scanning magnification in the subscanning direction, the document transportation speed is to be set at a speed advanced by just one pixel width (approximately 0.042 mm) of 600 dpi that is the scanning resolution of CCD 141 during the scanning period (Ta) per one line in the main scanning direction of CCD 141. Accordingly, the document transportation speed (Vr0) to scan an image at 1× in the subscanning direction can be obtained logically. The document transportation speed (Vr0) to scan an image at 1× in the subscanning direction is also referred to as "reference transportation speed Vr0".

When an image at 1× is to be scanned in the subscanning direction, MFP 1 transports a document at reference transportation speed Vr0, and has an image scanned by CCD 141. For example, in the case where a document of A4L size (main scanning direction 297 mm×subscanning direction 210 mm: hereinafter simply indicated as "main 297 mm×sub 210 mm") is to be scanned, the number of pixels in the subscanning direction of the scanned image is approximately 4960 pixels corresponding to 210 mm (the value of dividing 210 mm by one pixel width of 600 dpi). For the sake of convenience hereinafter, the size of a scanned image is expressed based on a length (mm) that is a converted version of the number of pixels based on the resolution (600 dpi).

The document transportation speed is determined based on the subscanning set magnification and reference transportation speed Vr0. Specifically, the document transportation speed corresponding to the subscanning set magnification is determined by dividing reference transportation speed Vr0 by the subscanning set magnification, as shown in equation (1).

Document transportation speed ($Vr1$)=(reference transportation speed $Vr0$)÷(subscanning set magnification) (1)

For example, when the subscanning set magnification is 1×, reference transportation speed Vr0 is taken as the document transportation speed (Vr1). When the subscanning set magnification is 2×, ½ reference transportation speed Vr0 is taken as the document transportation speed (Vr1). Accordingly, the magnification in the subscanning direction of a scanned image by CCD 141 will become 2×, A similar calculation applies to other subscanning set magnifications.

The document transportation speed at first scanning position L1 differs between before the trailing edge of the document moves away from transportation roller R1 (the transportation speed by transportation roller R1) and after the trailing edge of the document moves away from transportation roller R1 (the transportation speed by transportation roller R2). It is assumed that the portion transported at the transportation speed by transportation roller R2 can be neglected since first scanning position L1 is generally located extremely close to transportation roller R1.

Thus, in ADF one-side scanning, a scanned image corresponding to the subscanning set magnification can be obtained by altering the document transportation speed.

<Dual-Side Scanning>

The document transportation speed in dual-side scanning will be described hereinafter.

As mentioned before, the document transportation speed at second scanning position L2 depends on the transportation speed by the transportation rollers forwarding a document.

Specifically, a document is transported at the transportation speed of transportation roller R1 until the trailing edge of the document passes through transportation roller R1, and then transported at the transportation speed of transportation roller R2 when the trailing edge of the document moves away from transportation roller R1. The document is transported at the transportation speed by transportation roller R2 until the trailing edge of the document moves away from transportation roller R2, and then transported at the transportation speed of transportation roller R3 when the trailing edge of the document moves away from transportation roller R2.

With regard to respective document sizes, the distance (length) transported at the transportation speed by transportation roller R1, the length transported at the transportation speed by transportation roller R2, and the length transported at the transportation speed by transportation roller R3 are obtained, as shown in FIG. 7B.

Specifically for an A3 size (main 297 mm×sub 420 mm) document, the length transported at the transportation speed by transportation roller R1, transportation roller R2, and transportation roller R3 is 290 mm, 100 mm, and 30 mm, respectively.

Similarly, for an A4S size (main 210 mm×sub 297 mm) document, the length transported at the transportation speed by transportation roller R1, transportation roller R2, and transportation roller R3 is 167 mm, 100 mm, and 30 mm, respectively.

Similarly, for an A4L size (main 297 mm×sub 210 mm) document, the length transported at the transportation speed by transportation roller R1, transportation roller R2, and transportation roller R3 is 80 mm, 100 mm, and 30 mm, respectively.

Similarly, for an A5L (main 210 mm×sub 149 mm) document, the length transported at the transportation speed by transportation roller R1, transportation roller R2, and transportation roller R3 is 19 mm, 100 mm, and 30 mm, respectively.

Similarly, for a document of a postcard type (main 149 mm×sub 105 mm), the length transported at the transportation speed by transportation roller R1, transportation roller R2, and transportation roller R3 is 0 mm, 75 mm, and 30 mm, respectively.

The length transported at the transportation speed by respective transportation rollers at second scanning position L2 differs depending upon the positional relationship between transportation rollers R2, R3 and second scanning position L2. FIG. 7B shows the case where, by way of example, the transportation speed at first scanning position L1 and the transportation speed at second scanning position L2 are highest.

For an A3 type of document, 100 mm, among the document length of 420 mm in subscanning direction, is moved at the transportation speed by transportation roller R2 having a transportation speed higher than that of transportation roller R1, and 30 mm is moved at a transportation speed by transportation roller R3 having a further higher transportation speed.

With regard to the length moved at the transportation speeds by transportation rollers R2 and R3, among the length of the document in the subscanning direction, the length in the subscanning direction of a scanned image by CIS 129 (back side subscanning length) becomes shorter than the original length in the subscanning direction since the document is moved faster than reference transportation speed Vr0.

Therefore, when a document is moved at reference transportation speed Vr0 and the back side of the document is scanned by CIS 129, the back side subscanning length is 419.4 mm for a document of A3 size. For a document of A4S size, the back side subscanning length is 296.4 mm. For a document of A4L size, the back side subscanning length is 209.4 mm. For a document of A5S size, the back side subscanning length is 148.4 mm. For a document of a post card type, the back side subscanning length is 104.5 mm.

Thus, the back side subscanning length becomes shorter than the length in the subscanning direction of a scanned image by CCD 141 (top side subscanning length) due to the transportation speed at second scanning position L2 by CIS 129 being higher than the transportation speed at first scanning position L1 by CCD 141.

Converted on the basis of magnification, the magnification in the subscanning direction of a scanned image by CIS 129 (back side subscanning magnification) becomes 99.85% for a document of A3 size.

For a document of A4S size, the back side subscanning magnification becomes 99.79%. For a document of A4L size, the back side subscanning magnification becomes 99.70%. Similarly, for a document of A5S size, the back side subscanning magnification becomes 99.57%. For document of a post card size, the back side subscanning magnification becomes 99.49%.

Figure 8:
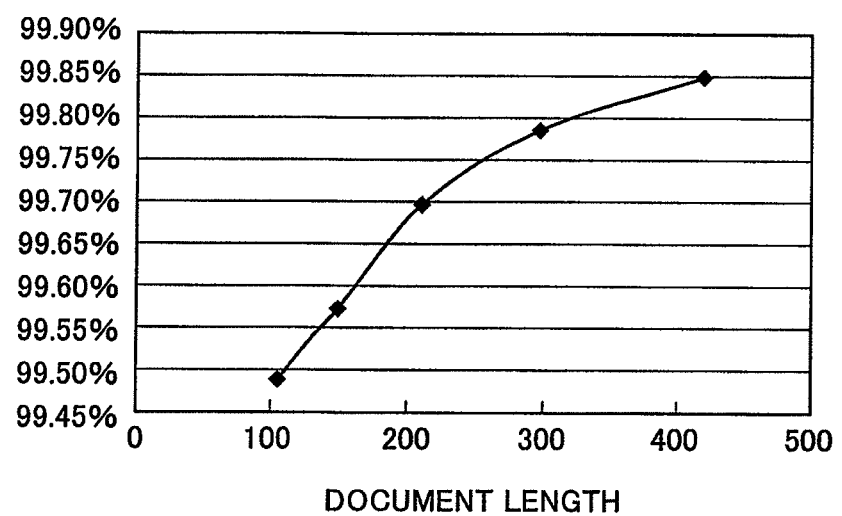
FIG. 8 is a graph representing the relationship between the length of a document in the subscanning direction and the scanning magnification in back side subscanning.

The relationship between the length of a document in the subscanning direction and the back subscanning magnification will be described based on FIG. 8. As shown in FIG. 8, the back side subscanning magnification becomes smaller as the length of the document in the subscanning direction becomes shorter. In other words, a back side scanned image is shrunk in the subscanning direction than the original document size as the length of the document in the subscanning direction becomes smaller.

To accommodate the shrinkage of the scanned image in the subscanning direction by CIS 129 as set forth above, the subscanning set magnification is corrected and the document transportation speed is change based on the corrected subscanning set magnification such that the magnification in the back side subscanning direction becomes 1× in dual-side scanning. This correction will be described in detail hereinafter.

1. Correction for A4L-Size Document

Correction for a document based on the size of A4L (main 297 mm×sub 210 mm) as a reference (hereinafter, also referred to as "reference document") will be described first.

The relationship between the transportation speed of transportation rollers and the size of a scanned image in dual-side scanning of an A4L-size document will be described based on FIG. 9.

Figure 9:
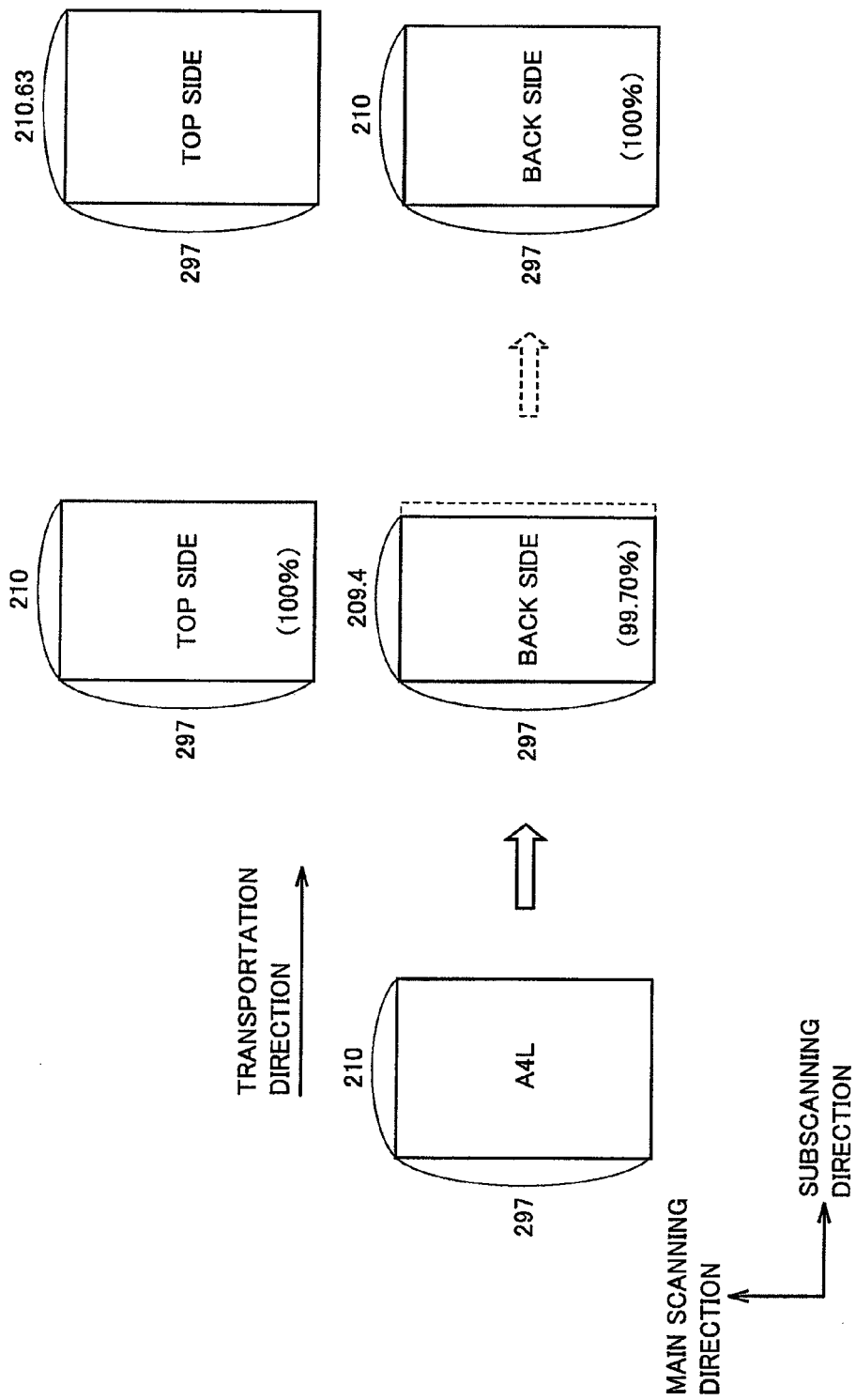
FIG. 9 is a diagram for describing the relationship between the transportation speed of a transportation roller and the size of a scanned image in dual-side scanning of an A4L document.

Referring to FIG. 9, when the document is transferred at reference transportation speed Vr0, the back side subscanning length is 209.4 mm. In other words, the back side scanned image is shrunk in the subscanning direction. In this case, the back side subscanning magnification is 209.4/210=99.70%.

Calculation of a correction coefficient (back side subscanning correction coefficient $\epsilon$) to correct the back side subscanning set magnification to 1× yields 1.003 (=100/99.7). In the following, the back side subscanning correction coefficient for the reference document (A4L) is also referred to as ∈0.

In dual-side scanning, the subscanning set magnification is corrected based on back side subscanning correction coefficient ∈0 to calculate a back side subscanning magnification correction value. The document transportation speed is determined based on the back side subscanning magnification correction value.

Specifically, the back side subscanning magnification correction value is obtained by equation (2).

$$\text{Back side subscanning magnification correction value} = (\text{subscanning set magnification}) \times (\text{back side subscanning correction coefficient } \epsilon) \quad (2)$$

When the subscanning set magnification is 1×, the back side subscanning magnification correction value takes a value identical to $\epsilon 0$, i.e. 1.003.

By inserting the back side subscanning magnification correction value obtained by equation (2) into equation (3), the document transportation speed is determined.

$$\text{Document transportation speed } (Vr1) = (\text{reference transportation speed } Vr0) \div (\text{back side subscanning magnification correction value}) \quad (3)$$

In other words, the document transportation speed is selected to be slightly slower than reference transportation speed Vr0. Accordingly, the back side subscanning magnification can be set to 1×. As a result, the back side subscanning length becomes 210 mm.

By transporting the document slower than reference transportation speed Vr0 to set the back side scanned image in equal-scale magnification, the subscanning magnification (top side subscanning magnification) of the scanned image by CCD 141 (top side scanned image) becomes larger than 1×. Specifically, the top side subscanning magnification becomes 1.003.

As such, the magnification correction value in the subscanning direction for the scanning image by CCD 141 (top side subscanning magnification correction value) is calculated by equation (4).

$$\text{Top side subscanning magnification correction value} = (\text{subscanning set magnification}) / (\text{back side subscanning correction coefficient } \epsilon) \quad (4)$$

In other words, the magnification for the top side scanning image is corrected such that the image is restored to the original (that is, shrunk) by just the delay of reference transportation speed Vr0 (that is, by the increased portion) to set the back side subscanning magnification to 1×.

Then, an electronic variable scale magnification process (decimation process) in the subscanning direction according to the calculated top-side subscanning magnification correction value is applied to the top side scanned image.

By setting the document transportation speed such that the back-side subscanning magnification is 1× in dual-side scanning, an image of equal-scale magnification can be obtained without electronic variable scale magnification in the subscanning direction for a back side scanned image. Furthermore, an image of equal-scale magnification can be obtained by electronic decimation in the subscanning direction for a top-side scanned image.

2. Correction for a Document Other than A4L-Size Document

Correction for a document of a size other than the reference document (A4L) will be described hereinafter.

First, a ratio of a back side subscanning magnification for each document size to the back side subscanning magnification for a reference document (A4L) is obtained.

Specifically, since the A3 back-side subscanning magnification is 99.85% and the A4L back side subscanning magnification is 99.70%, the ratio of the back side subscanning magnification of A3 to A4L is 100.15%. This means that the back side subscanning magnification of A3 will become 100.15% when a document is transferred at a transportation speed such that the A4L back side subscanning magnification becomes 1×.

Further, since the back side subscanning magnification of A4S and A4L is 99.79% and 99.70%, respectively, the ratio of the back side subscanning magnification of A4S to A4L is 100.09%. The same calculation applies to documents of other sizes.

Thus, by correcting reference transportation speed Vr0 by back side subscanning correction coefficient $\epsilon 0$ of the reference document (A4L), the back side subscanning magnification will become 1× for the reference document (A4L). However, the back side subscanning magnification will not become 1× for a document of a size other than that of the reference document (A4L). This is because the ratio of the length transported at the transportation speed by transportation roller R2 and the length transported at the transportation speed by transportation roller R3 to the entire length of the document in the subscanning direction differs for each document size.

Thus, based on the ratio of the back side subscanning magnification of each document size to A4L set forth above, the subscanning set magnification is corrected such that the back side scanned image attains equal-scale magnification for a document of a size other than A4L.

Specifically, the reciprocal of the ratio of the back side subscanning magnification to A4L is used as the correction coefficient (size dependent correction coefficient α).

Since the ratio of the back side subscanning magnification of document size A3 to A4L is 100.15%, the size dependent correction coefficient α becomes 99.85% (=100/100.15). Similarly, since the ratio of the back side subscanning magnification of document size A4S to A4L is 100.09%, the size dependent correction coefficient α becomes 99.91% (=100/100.09). A similar calculation applies to other document sizes.

In dual-side scanning, the subscanning set magnification is corrected based on back side subscanning correction coefficient ϵ0 and size dependent correction coefficient α corresponding to the relevant document size, to obtain the back side subscanning magnification correction value, as shown in equation (5).

$$\text{Back side subscanning magnification correction value} = (\text{subscanning set magnification}) \times (\text{back side subscanning correction coefficient } \epsilon 0) \times (\text{size dependent correction coefficient } \alpha \text{ corresponding to document size}) \quad (5)$$

Then, the back side subscanning magnification correction value obtained by equation (5) is inserted to equation (3) to determine the document transportation speed (Vr1).

By correcting the subscanning set magnification using size dependent correction coefficient α corresponding to the relevant document size in addition to subscanning correction coefficient ϵ0, the back side subscanning magnification can be set 1× even for a document of a size other than that of the reference document (A4L).

If the document transportation speed (Vr1) is determined such that the back side subscanning magnification attains 1×, the top side subscanning magnification will not become 1×, likewise with reference document A4L.

Therefore, the top side subscanning magnification correction value is calculated by equation (6), and a decimation process in the subscanning direction according to the calculated top side subscanning magnification correction value is applied to the top side scanned image.

$$\text{Top side subscanning magnification correction value} = (\text{subscanning set magnification})/(\text{back side subscanning correction coefficient } \epsilon 0)/(\text{size dependent correction coefficient } \alpha \text{ corresponding to document size}) \quad (6)$$

Thus, in the case of dual-side scanning of a document other than the reference document (A4L), the back side subscanning magnification is corrected by a correction coefficient corresponding to the size, i.e. a correction coefficient for correcting variation in size (size dependent correction coefficient α), and the document transportation speed is set such that the back side subscanning magnification attains 1×. Thus, an image of equal-scale magnification can be obtained without electronic variable scale magnification in the subscanning direction for the back side scanned image. Moreover, an image of equal-scale magnification can be obtained by electronic decimation in the subscanning direction for a top side scanned image.

Magnification correction value ϵ0 corresponding to scanning a duplex document of the reference document (A4L), and size dependent correction coefficient α for each document size are stored in the form of a data table in ROM 30. The graph shown in FIG. 8 may be stored in ROM 30 as an approximate expression to allow calculation of size dependent correction coefficient α by substituting the document size (length of the document in the subscanning direction) into the approximate expression.

3. Correction in the Presence of Machinery Difference Variation

The above description is based on a method of correction to set the top side subscanning magnification and back side subscanning magnification at 1× for dual-side scanning on the assumption that there is no machinery difference variation such as in the attached position of a component including CCD 141, CIS 129 and the like.

In general, MFP 1 has variation in machinery difference such as in the attached position of a component including CCD 141, CIS 129 and the like, which leads to variation in the scanning magnification for each device. It is therefore necessary to carry out a process to correct variation in the scanning magnification caused by such machinery difference variation.

Correction in consideration of machinery difference variation will be described hereinafter.

First, a correction coefficient used in correcting variation in scanning magnification caused by machinery difference variation will be described (i). Then, a correction process employing the relevant correction coefficient will be described (ii).

(i) Correction Coefficient for Correcting Machinery Difference Variation

MFP 1 uses a machinery difference correction coefficient β as a correction coefficient for correcting variation in scanning magnification caused by machinery difference variation. Machinery difference correction coefficient β is a coefficient calculated based on an image actually scanned at MFP 1. This correction coefficient is calculated when MFP 1 is fabricated (before shipment), and prestored in ROM 30.

A method of calculating machinery difference correction coefficient β will be described hereinafter with reference to FIG. 10.

Machinery difference variation is seen in the mechanism related to scanning by CCD 141 in manual placement scanning (for example, the slider unit including reflection mirrors 137A, 137B, 137C; slider motor; lens 139), the mechanism related to scanning by CCD 141 in ADF scanning (for example, transportation roller R1; reflection mirrors 137A, 137B, 137C; lens 139), and the mechanism related to scanning by CIS 129 in ADF scanning (for example, transportation roller R2). The cited mechanisms are only by way of example, and machinery difference variation may be caused by other elements.

It is therefore necessary to calculate a machinery difference correction coefficient β corresponding to scanning by CCD 141 in manual placement, scanning by CCD 141 in ADF one-side scanning or dual-side scanning (ADF top side scanning), and scanning by CIS 129 in dual-side scanning (ADF back side scanning).

Figure 10:
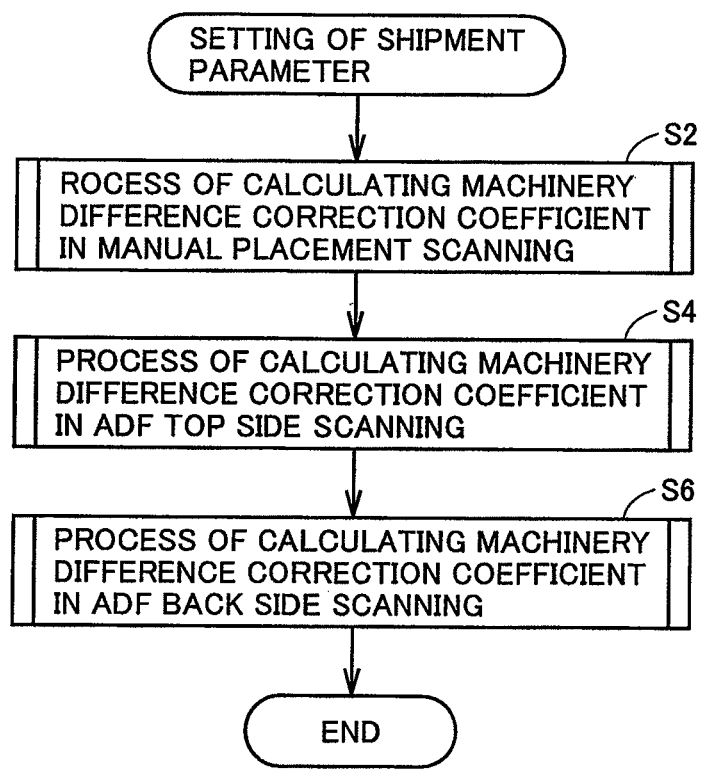
FIG. 10 is a flowchart for describing a method of calculating a machinery difference correction coefficient β.

Referring to FIG. 10, a calculation process for machinery difference correction coefficient β in association with manual placement scanning is executed (step S2). Details thereof will be described afterwards.

Then, a calculation process of machinery difference correction coefficient β in association with ADF top side scanning is executed (step S4). Details thereof will be described afterwards.

Then, a calculation process for machinery difference correction coefficient β associated with ADF back side scanning is executed (step S6). Details thereof will be described afterwards. Thus, the process ends.

(i-1) Machinery Difference Correction Coefficient in Association with Manual Placement Scanning A calculation process of machinery difference correction coefficient 13 related to manual placement scanning at step S2 in the flowchart of FIG. 10 will be described based on FIG.

11. Machinery difference correction coefficient β for all of manual placement scanning, ADF top side scanning, and ADF back side scanning is calculated based on a reference document (A4L).

Figure 11:
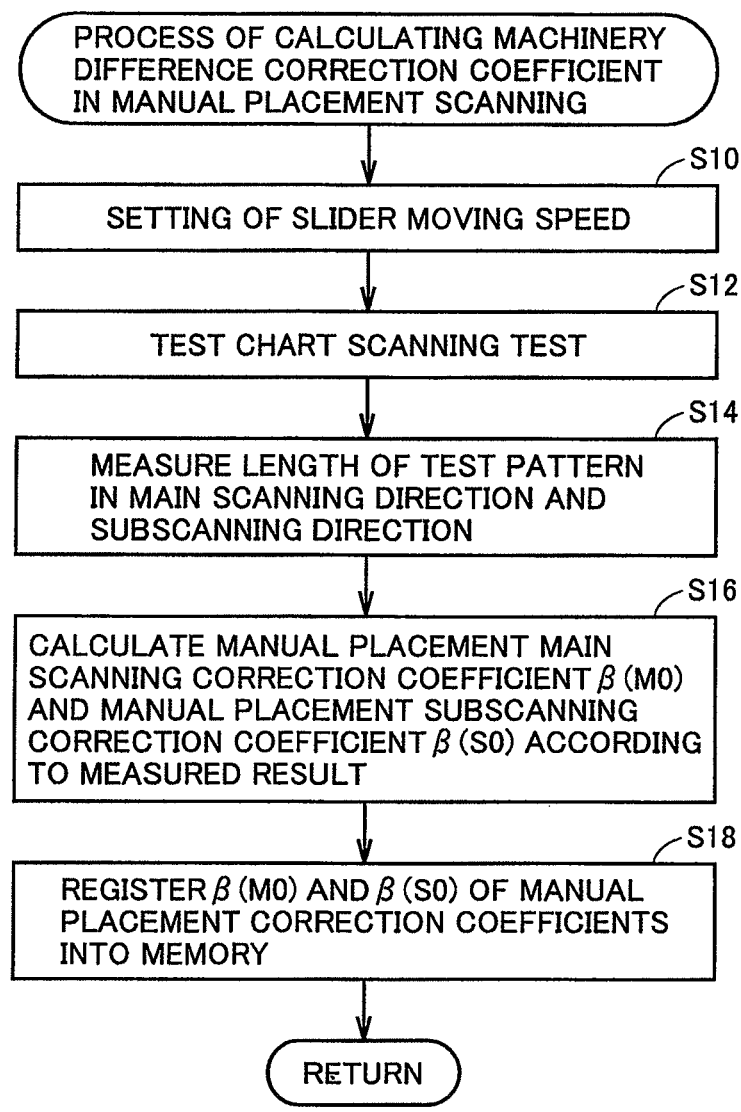
FIG. 11 is a diagram for describing a calculation process of a machinery difference correction coefficient β related to manual placement scanning at step S2 in the flowchart of FIG. 10.

Referring to FIG. 11, first reference transportation speed Vr0 is set as the slider moving speed (step S10).

Then, an A4L-size test chart is placed on platen glass 132 to have the image of the test chart scanned (scan test) (step S12). A test chart having a rectangular pattern slightly smaller than the A4L size (test pattern) printed, for example, is used.

Then, the length of the test pattern in the main scanning direction and subscanning direction of the scanned image of the test chart is measured (step S14).

Based on the measurement results, correction coefficient β (M0) in the main scanning direction in a manual placement scanning mode, and correction coefficient β (S0) in the subscanning direction in a manual placement scanning mode are calculated (step S16). In the following, correction coefficient β (M0) in the main scanning direction in a manual placement scanning mode is referred to as a manual placement main scanning correction coefficient β (M0), and correction coefficient β (S0) in the subscanning direction in a manual placement scanning mode is referred to as manual placement subscanning correction coefficient β (S0). Also, manual placement main scanning correction coefficient β (M0) and manual placement subscanning correction coefficient β (S0) are generically referred to as the manual placement correction coefficient.

Manual placement main scanning correction coefficient β (M0) is calculated based on the measured value of the width of the test pattern in the main scanning direction and the original width of the test pattern in the main scanning direction. Specifically, manual placement main scanning correction coefficient β (M0) is calculated by equation (7).

Manual placement main scanning correction coefficient β(M0)=(original width in main scanning direction)/(measured value of width in main scanning direction) (7)

Manual placement main scanning correction coefficient β (M0) takes a value smaller than 1.000 when the width of the test pattern in the main scanning direction is larger than the original width, i.e. when the main scanning magnification is larger than 1×, and takes a value larger than 1.000 when the width of the test pattern in the main scanning direction is smaller than the original width, i.e. when the main scanning magnification is smaller than 1×.

Further, manual placement subscanning correction coefficient β (S0) is calculated based on the measured width value of the test pattern in the subscanning direction and the original width of the test pattern in the subscanning direction. Specifically, manual placement subscanning correction coefficient β (S0) is calculated by equation (8).

Manual placement subscanning correction coefficient β(S0)=(original width in subscanning direction)/(measured value of width in subscanning direction) (8)

Manual placement correction coefficients β (M0) and β (S0) are registered in ROM 30 (step S18), and the calculation process of manual placement scanning correction coefficient β is ended (return).

An example of a scanned image of a test chart according to step S12 in the flowchart of FIG. 11 will be described based on FIG. 12. As mentioned above, the test pattern printed on the test chart is a rectangular pattern slightly smaller than the A4L size. However, for the sake of convenience in FIG. 12, the test pattern is illustrated as having a size identical to the A4L size.

Figure 12:
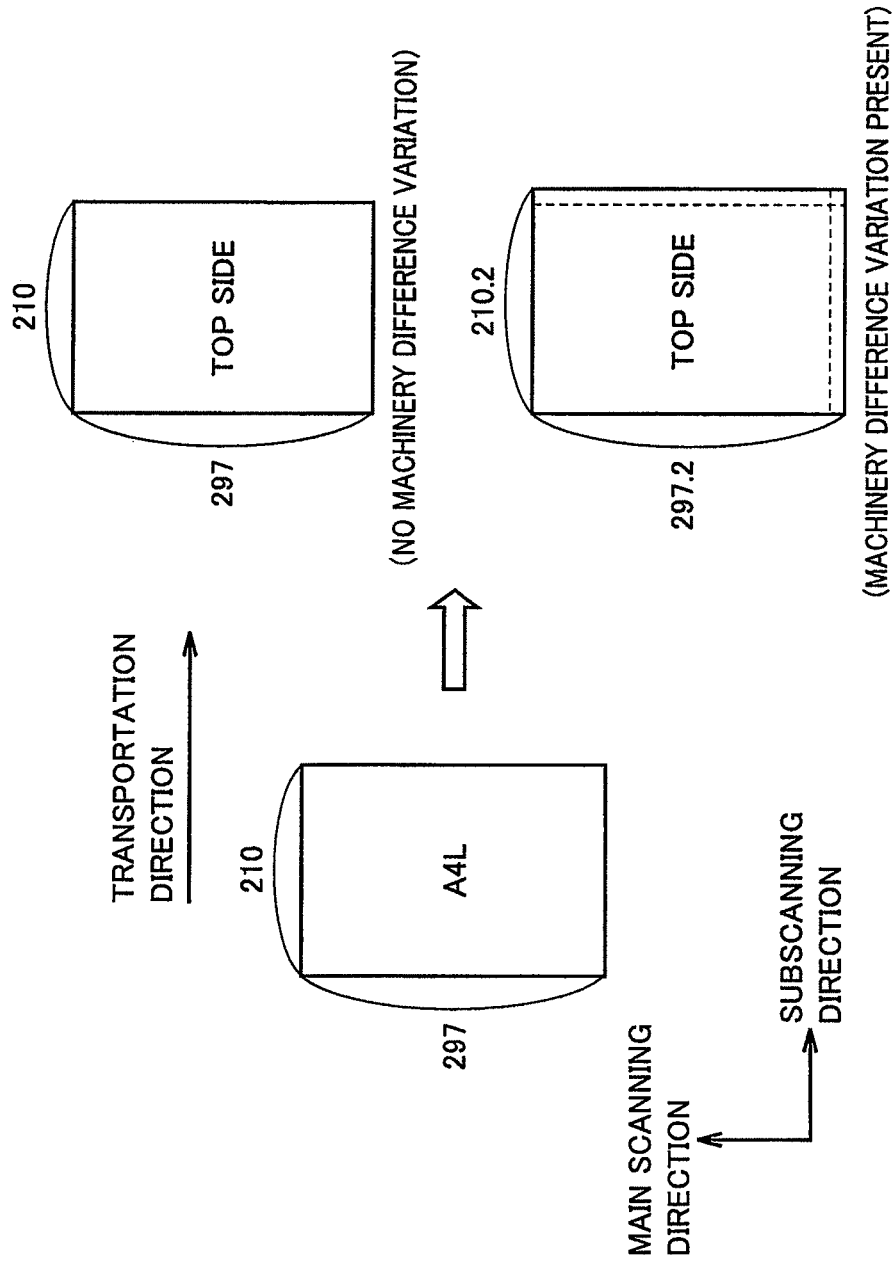
FIG. 12 shows an example of a scanned image of a test chart scanned at step S12 in the flowchart of FIG. 11.

Referring to FIG. 12, a scanned image of a test chart in an ideal state absent of machinery difference variation, and a scanned image of a test chart in the event of machinery difference variation are shown.

As an example of a scanned image of a test chart in the event of machinery difference variation, there is shown a test pattern of A4L (main 297 mm×sub 210 mm) read out at the size of main 297.2 mm×sub 210.2 mm.

In this case, manual placement main scanning correction coefficient β (M0) is calculated as set forth below by inserting the original width in the main scanning direction (297 mm) and the measured value of the width in the main scanning direction (297.2 mm) into equation (7).

β(M0)=0.999=297/297.2

Further, manual placement subscanning correction coefficient β (S0) is calculated as set forth below by inserting the original width in the subscanning direction (210 mm) and the measured value of the width in the sub scanning direction (210.2 mm) into equation (8).

β(S0)=0.999=210/210.2

In an ideal situation where there is no machinery difference variation, the values of β (M0) and β (S0) are both 1.000.

(i-2) Machinery Difference Correction Coefficient Related to ADF Top Side Scanning A calculation process of machinery difference correction coefficient β related to ADF top side scanning at step S4 in the flow chart of FIG. 10 will be described based on FIG. 13. The calculation process of machinery difference correction coefficient β related to ADF top side scanning is basically similar to the calculation process of manual placement correction coefficient β shown in FIG. 11.

Figure 13:
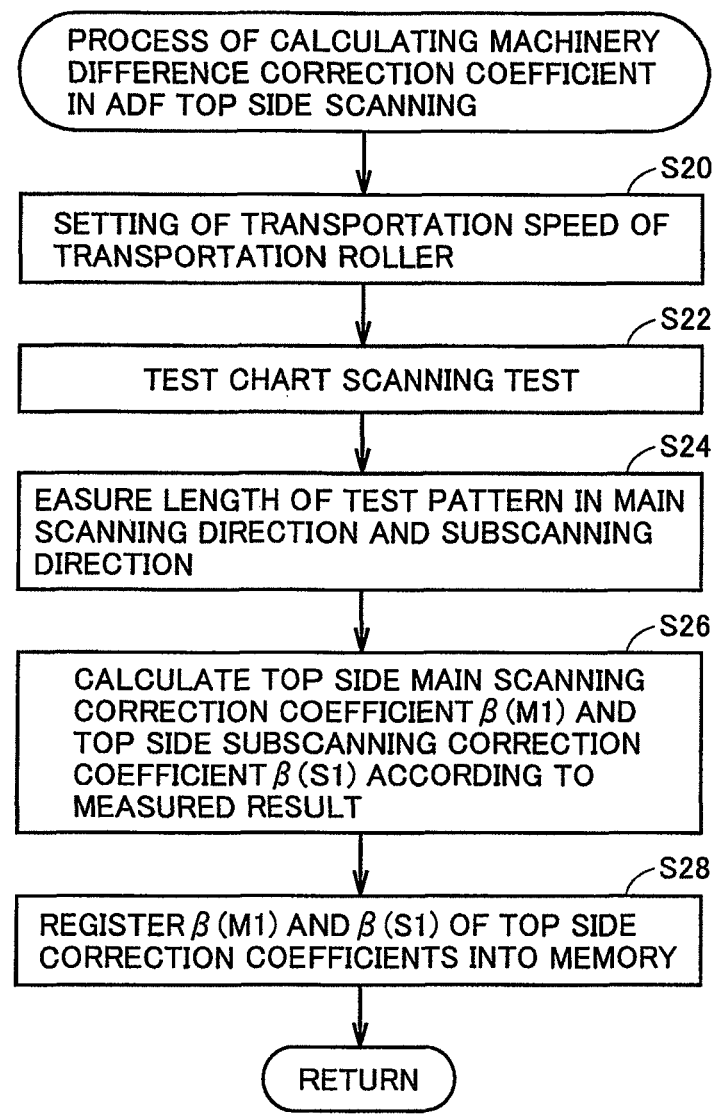
FIG. 13 is a diagram for describing a calculation process of machinery difference correction coefficient β related to ADF top side scanning at step S4 in the flowchart of FIG. 10.

Referring to FIG. 13, reference transportation speed Vr0 is set as the transportation speed of the transportation rollers (step S20).

The aforementioned test chart is placed on document tray 17 to be subjected to image scanning (scanning test) in ADF one-side scanning (step S22).

Then, the length of the test pattern in the main scanning direction and subscanning direction at the scanned image of the test chart is measured (step S24).

Based on the measurement results, correction coefficient β (M1) in the main scanning direction in an ADF top side scanning mode, and correction coefficient β (S1) in the subscanning direction in an ADF top side scanning mode are calculated (step S26). In the following, correction coefficient β (M1) in the main scanning direction in an ADF top side scanning mode is referred to as top side main scanning correction coefficient β (M1), and correction coefficient β (S1) in the subscanning direction in an ADF top side scanning mode is referred to as top side subscanning correction coefficient β (S1). Also, top side main scanning correction coefficient β (M1) and top side subscanning correction coefficient β (S1) are generically referred to as the top side correction coefficient.

Top side main scanning correction coefficient β (M1) is calculated by equation (9), likewise with the manual placement scanning.

Top side main scanning correction coefficient β(M1)= (original width in main scanning direction)/(measured value of width in main scanning direction) (9)

Top side subscanning correction coefficient β (S1) is calculated by equation (10), likewise with the manual placement scanning.

Top side subscanning correction coefficient β(S1)= (original width in subscanning direction)/(measured value of width in subscanning direction) (10)

Top side correction coefficients β (M1) and β (S1) are registered in ROM 30 (step S28), and the calculation process of top side correction coefficient β is ended (return).

The approach of calculating the correction value in top side main scanning correction coefficient β (M1) and top side subscanning correction coefficient β (S1) is similar to that of manual placement main scanning correction coefficient β (M0) and manual placement subscanning correction coefficient β (S0) described above with reference to FIG. 12. Therefore, description thereof will not be repeated.

(i-3) Machinery Difference Correction Coefficient Related to ADF Back Side Scanning A calculation process of machinery difference correction coefficient β related to ADF back side scanning at step S6 in the flow chart of FIG. 10 will be described based on FIG. 14. The calculation process of machinery difference correction coefficient β related to ADF back side scanning is basically similar to the calculation process of manual placement correction coefficient β shown in FIG. 11.

Figure 14:
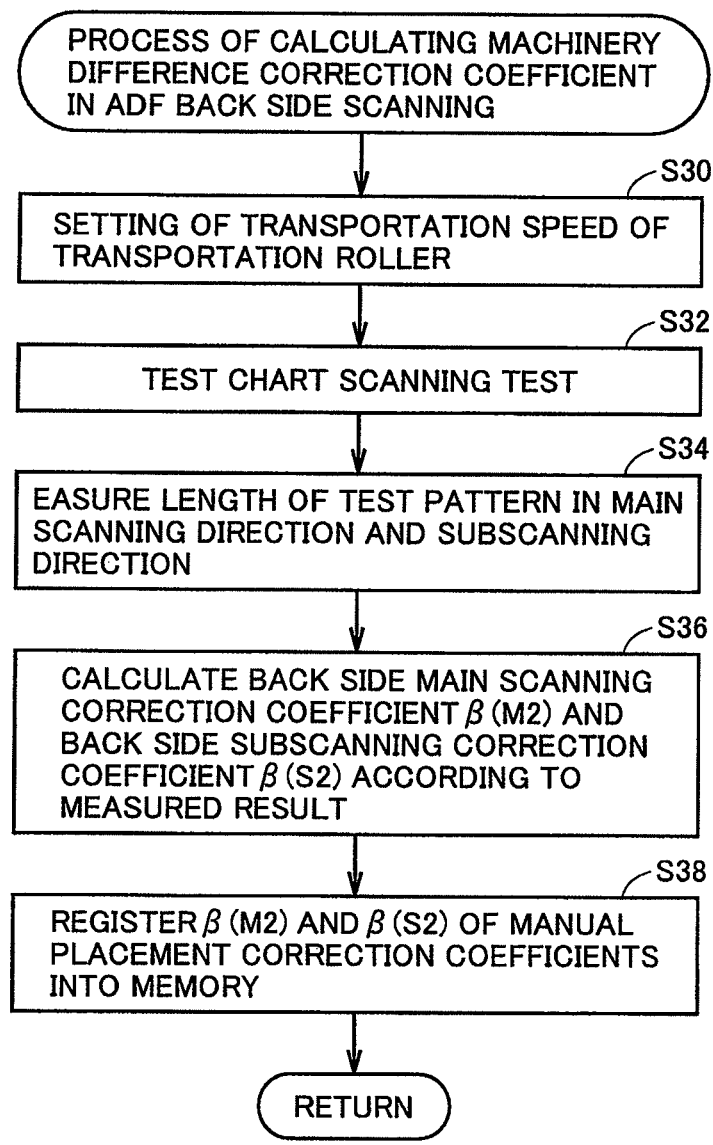
FIG. 14 is a diagram for describing a calculation process of machinery difference correction coefficient β related to ADF back side scanning at step S6 in the flowchart of FIG. 10.

Referring to FIG. 14, reference transportation speed Vr0 is set as the transportation speed of the transportation rollers (step S30).

Then, the test chart is placed on document tray 17 such that the test pattern is at the back side. Image scanning (scanning test) is performed in a dual-side scanning mode (step S32). In the present scanning test, a scanned image by CIS 129, i.e. back side scanned image, is obtained.

Then, the length of the test pattern in the main scanning direction and subscanning direction at the back side scanned image of the test chart is measured (step S34). The length measured at this stage includes the effect of, not only machinery difference variation, but also a difference in the subscanning magnification caused by a difference in the transportation speed between first scanning position L1 by CCD 141 and second scanning position L2 by CIS 129.

Based on the measurement results, correction coefficient β (M2) in the main scanning direction in an ADF back side scanning mode, and correction coefficient β (S2) in the subscanning direction in an ADF back side scanning mode are calculated (step S36). In the following, correction coefficient β (M2) in the main scanning direction in an ADF back side scanning mode is referred to as back side main scanning correction coefficient β (M2), and correction coefficient β (S2) in the subscanning direction in an ADF back side scanning mode is referred to as back side subscanning correction coefficient β (S2). Also, back side main scanning correction coefficient β (M2) and back side subscanning correction coefficient β (S2) are generically referred to as the back side correction coefficient.

Back side main scanning correction coefficient β (M2) is calculated by equation (11).

Back side main scanning correction coefficient $\beta(M2)$
=(original width in main scanning direction)/
(measured value of width in main scanning direction) (11)

Back side subscanning correction coefficient β (S2) is calculated by equation (12).

Back side subscanning correction coefficient $\beta(S2)$=
(original width in subscanning direction)/(measured value of width in subscanning direction) (12)

Back side correction coefficients β (M2) and β (S2) are registered in ROM 30 (step S38), and the calculation process of manual placement correction coefficient β is ended (return).

An example of a scanned image of a test chart according to step S32 in the flowchart of FIG. 14 will be described based on FIG. 15. For the sake of convenience likewise with FIG. 12, the test pattern is illustrated as having a size identical to the A4L size.

Referring to FIG. 15, there are shown a scanned image of a test chart in an ideal state absent of machinery difference variation, and a scanned image of a test chart in the event of machinery difference variation.

In an ideal state where there is no machinery difference variation, the test pattern of A4L (main 297 mm×sub 210 mm) is scanned at the size of main 297.0 mm×sub 209.4 mm. This is due to the difference in the document transportation speed between first scanning position L1 of CCD 141 and second scanning position L2 of CIS 129.

In this case, back side subscanning correction coefficient β (S2) is calculated by inserting the original width in the subscanning direction (210 mm) and the measured value of the width in the subscanning direction (209.4 mm) into equation (12).

$\beta(S2)=1.003=210/209.4$

Back side correction coefficient β (S2) becomes 1.003 when in a state where there is no machinery difference variation.

FIG. 15 shows an example of a scanned image of the test pattern when there is machinery difference variation. A test pattern of A4L (main 297 mm×sub 210 mm) is scanned at the size of main 297.2 mm×sub 209.6 mm.

In this case, back side main scanning correction coefficient β (M2) is calculated by inserting the original width in the main scanning direction (297 mm) and the measured value of the width in the main scanning direction (297.2 mm) into equation (11), as set forth below.

$\beta(M2)=0.999=297/297.2$

Further, back side subscanning correction coefficient β (S2) is calculated by inserting the original width in the subscanning direction (210 mm) and the measured value in the subscanning direction (209.6) into equation (12), as set forth below.

$\beta(S2)=1.002=210/209.6$

The back side subscanning correction coefficient β (S2) in the event of machinery difference variation includes the effect of not only machinery difference variation in association with scanning by CIS 129, but also a difference in the transportation speed between first scanning position L1 by CCD 141 and second scanning position L2 by CIS 129.

The correction coefficients registered in ROM 30 according to the setting process of the shipment parameter shown in FIG. 10 will be described based on FIGS. 16A-16C.

Referring to FIG. 16A, manual placement main scanning correction coefficient β (M0) and manual placement subscanning correction coefficient β (S0) are registered in ROM 30.

The manual placement correction coefficients are directed to correcting variation in scanning magnification caused by machinery difference variation related to manual placement scanning, and are used for the magnification correction on a scanned image by manual placement scanning.

Referring to FIG. 16B, top side main scanning correction coefficient β (M1) and top side subscanning correction coefficient β (S1) are registered in ROM 30.

The top side correction coefficients are directed to correcting variation in scanning magnification caused by machinery difference variation related to scanning a top side image in an ADF scanning mode, and are used for the magnification correction on a top side scanned image in an ADF scanning mode.

Referring to FIG. 16C, back side main scanning correction coefficient β (M1) and back side subscanning correction coefficient β (S1) are registered in ROM 30.

The back side correction coefficients are directed to correcting variation in scanning magnification caused by machinery difference variation related to scanning a back side image in an ADF scanning mode, and are used for the magnification correction on a back side scanned image in an ADF scanning mode.

(ii) Correction Process Using Machinery Difference Correction Coefficient

Contents of a correction process taking into account machinery difference variation will be described hereinafter.

(ii-1) Correction Process Related to Manual Placement Scanning

In manual placement scanning, manual placement main scanning correction coefficient β (M0) and manual placement subscanning correction coefficient β (S0) are used to correct the main scanning set magnification and subscanning set magnification.

In manual placement scanning, the subscanning set magnification is corrected based on manual placement subscanning correction coefficient β (S0) to calculate a manual placement subscanning magnification correction value in association with the subscanning direction. Then, the slider moving speed is determined based on the manual placement subscanning magnification correction value.

Specifically, the manual placement subscanning magnification correction value is obtained by equation (13).

Manual placement subscanning magnification correction value=(subscanning set magnification)×(manual placement subscanning correction coefficient β(S0)) (13)

By inserting the manual placement subscanning magnification correction value obtained by equation (13) into equation (14), the slider moving speed is determined.

Slider moving speed (Vr1)=(reference transportation speed Vr0)÷(manual placement subscanning magnification correction value) (14)

By scanning an image at the slider moving speed (Vr1) calculated by equation (14), the subscanning magnification in a manual placement scanning mode attains 1×.

In manual placement scanning, the main scanning set magnification is corrected based on manual placement main scanning correction coefficient β (M0) to calculate the manual placement main scanning magnification correction value in association with the main scanning direction. The correction process is performed by applying an electronic variable scale magnification (decimation or inflate) process in the main scanning direction based on the manual placement main scanning magnification correction value.

Specifically, the manual placement main scanning magnification correction value is obtained by equation (15).

(Manual placement main scanning magnification correction value=(main scanning set magnification)×(manual placement main scanning correction coefficient β(M0)) (15).

Based on the manual placement main scanning magnification correction value obtained by equation (15), an electronic variable scale magnification process in the main scanning direction is carried out. Thus, the main scanning magnification attains 1× in manual placement scanning.

For the electronic variable scale magnification process, the general variable scale magnification process such as shrinkage by simple decimation, enlargement by simple inflating, for example, is used, but not limited thereto. The same applies to the electronic variable scale magnification process set forth below. Therefore, description thereof will not be repeated.

(ii-2) Correction Process Related to ADF One-Side Scanning

In one-side scanning by ADF scanning, the main scanning set magnification and subscanning set magnification are corrected using top side main scanning correction coefficient β (M1) and top side subscanning correction coefficient β (S1).

In the case of ADF one-side scanning, the subscanning set magnification is corrected based on top side subscanning correction coefficient β (S1) to calculate the top side subscanning magnification correction value in association with the subscanning direction. Then, the document transportation speed is determined based on the top side subscanning magnification correction value.

Specifically, the top side subscanning magnification correction value is obtained by equation (16).

Top side subscanning magnification correction value=(subscanning set magnification)×(top side subscanning correction coefficient β(S1)) (16)

By inserting the top side subscanning magnification correction value obtained by equation (16) into equation (17), the document transportation speed is determined.

Document transportation speed (Vr1)=(reference transportation speed Vr0)÷(top side subscanning magnification correction value) (17)

By scanning an image at the document transportation speed (Vr1) calculated at equation (17), the subscanning magnification in one-side scanning by ADF scanning attains 1×.

In the case of ADF one-side scanning, the main scanning set magnification is corrected based on top side main scanning correction coefficient β (M1) to calculate the top side main scanning magnification correction value in association with the main scanning direction. Then, the correction process is performed by applying an electronic variable scale magnification (decimation or inflate) process in the main scanning direction based on the top side main scanning magnification correction value.

Specifically, the top side main scanning magnification correction value is obtained by equation (18).

Top side main scanning magnification correction value=(main scanning set magnification)×top side main scanning correction coefficient β(M1)) (18)

Based on the top side main scanning magnification correction value obtained by equation (18), the electronic variable scale magnification process in the main scanning direction is carried out. Accordingly, the main scan scanning magnification in one-side scanning by ADF scanning attains 1×.

(ii-3) Correction Process Related to Dual-Side Scanning

In a dual-side scanning mode, the main scanning set magnification and subscanning set magnification are corrected using top side main scanning correction coefficient β (M1), top side subscanning correction coefficient β (S1), back side main scanning correction coefficient β (M2), and back side subscanning correction coefficient β (S2).

In dual-side scanning, the subscanning set magnification is corrected based on back side subscanning correction coefficient β (S2) to calculate the back side subscanning magnification correction value in association with the subscanning direction. Then, the document transportation speed is determined based on the back side subscanning magnification correction value.

Specifically, the back side subscanning magnification correction value is obtained by equation (19).

Back side subscanning magnification correction value=(subscanning set magnification)×(back side subscanning correction coefficient β(S2))  (19)

By inserting the back side subscanning magnification correction value obtained by equation (19) into equation (20), the document transportation speed is determined.

Document transportation speed (Vr1)=(reference transportation speed Vr0)÷(back side subscanning magnification correction value)  (20)

By transporting a document at the document transportation speed (Vr 1) calculated at equation (20), the subscanning magnification of the back side scanned image in a dual-side scanning mode attains 1×, In dual-side scanning, the main scanning set magnification is corrected based on back side main scanning correction coefficient β (M2) to calculate the back side main scanning magnification correction value in association with the main scanning direction of the back side scanned image. The correction process is performed by applying an electronic variable scale magnification (decimation or inflate) process in the main scanning direction based on the back side main scanning magnification correction value.

Specifically, the back side main scanning magnification correction value is obtained by equation (21).

Back side main scanning magnification correction value=(main scanning set magnification)×(back side main scanning correction coefficient β(M2))  (21)

Based on the back side main scanning magnification correction value obtained by equation (21), the electronic variable scale magnification process in the main scanning direction is carried out. Accordingly, the main scanning magnification of the back side scanned image in a dual-side scanning mode attains 1×.

In dual-side scanning, the top side subscanning set magnification is corrected based on top side subscanning correction coefficient β (S1) and back side subscanning correction coefficient β (S2) to calculate the top side subscanning magnification correction value in association with the subscanning direction of the top side scanned image. The correction process is performed by applying an electronic variable scale magnification process (decimation process) based on the top side subscanning magnification correction value.

Specifically, the top side subscanning magnification correction value is obtained by equation (22).

Top side subscanning magnification correction value= (subscanning set magnification)×(top side subscanning correction coefficient β(S1))÷(back side subscanning correction coefficient β(S2))  (22)

Based on the top side subscanning magnification correction value obtained by equation (22), an electronic variable scale magnification process (decimation process) is applied on the top side scanned image in the subscanning direction. Accordingly, the subscanning magnification of the top side scanned image in a dual-side scanning mode attains 1×.

The reason why correction of the set magnification of the top side scanned image in the subscanning direction is carried out based on top side subscanning correction coefficient β (S1) and back side subscanning correction coefficient β (S2) will be described hereinafter.

The top side subscanning correction coefficient β (S1) is directed to correcting the top side subscanning magnification to attain 1× when the document transportation speed is Vr0, as mentioned above. Therefore, when the document transportation speed is Vr0, the set magnification in the subscanning direction of the top side scanned image is to be corrected based on only top side subscanning correction coefficient β (S1).

However, since the document transportation speed is altered such that the subscanning magnification of the back side scanned image attains 1× in a dual-side scanning mode, the top side subscanning magnification will not attain 1× even if the set magnification of the top side scanned image in the subscanning direction is corrected based on only top side subscanning correction coefficient β (S1). Specifically, an image enlarged by just the back side subscanning correction coefficient β (S2) will be obtained.

Therefore, the subscanning set magnification must be corrected by top side subscanning correction coefficient β (S1), and further corrected by back side subscanning correction coefficient β (S2), as in equation (22).

In a dual-side scanning mode, the main scanning set magnification is corrected based on top side main scanning correction coefficient β (M1) in association with the main scanning direction of the top side scanned image to calculate the top side main scanning magnification correction value. The correction process is effected by applying an electronic variable scale magnification (decimation or inflate) process in the main scanning direction based on the top side main scanning magnification correction value.

Specifically, the top side main scanning magnification correction value is obtained by equation (23).

Top side main scanning magnification correction value=(main scanning set magnification)×top side main scanning correction coefficient β(M1)  (23)

Based on the top side main scanning magnification correction value obtained by equation (23), the electronic variable scale magnification process in the main scanning direction is carried out. Accordingly, the main scanning magnification of the top side scanned image in a dual-side scanning mode attains 1×.

The flow of the process when a copy function is executed at MFP 1 according to an embodiment of the present invention will be described based on FIG. 17. Control unit 20 performs the process according to the flowchart of FIG. 17 based on a program stored in ROM 30.

Figure 17:
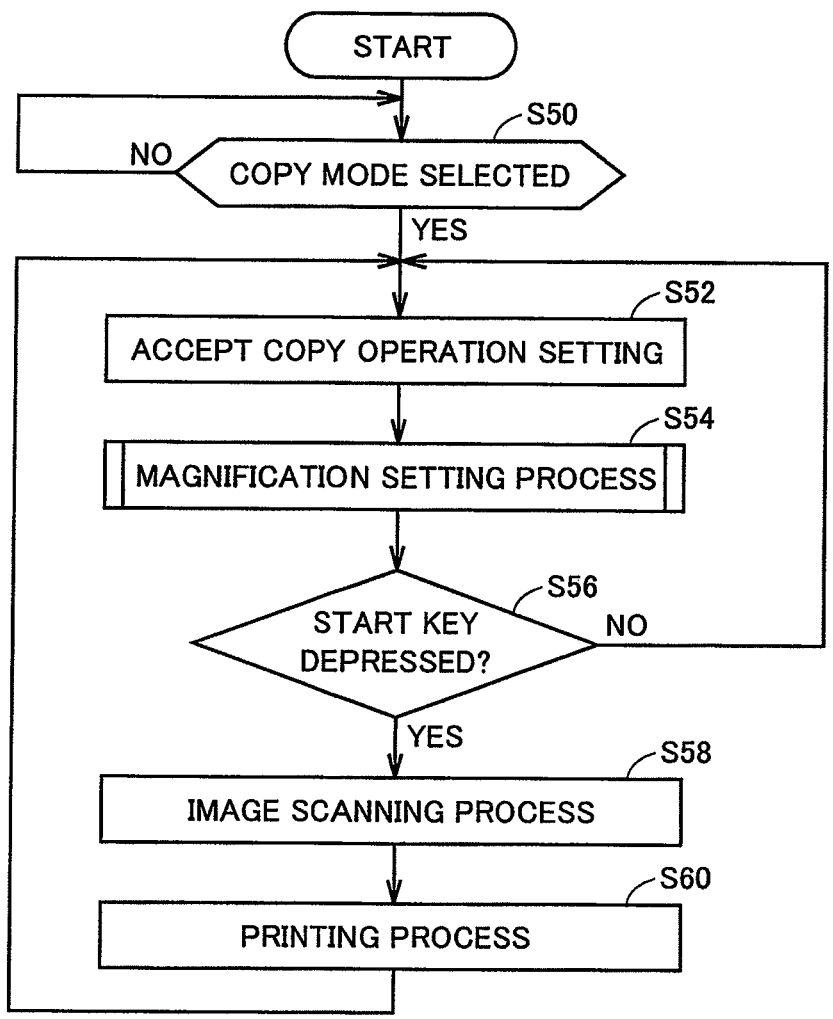
FIG. 17 is a flowchart for describing a process when a copy function is executed at an MFP according to an embodiment of the present invention.

Referring to FIG. 17, a determination is made as to whether a copy mode is selected or not (step S50).

Specifically, the determination is made based on whether copy key 210 is depressed or not. The relevant state is maintained continuously until copy key 210 is depressed.

When copy key 210 is depressed (YES at step S50), control unit 20 accepts the setting for the copy operation from the user (step S52).

The user can apply various settings for the copy operation according to the contents displayed on operation panel 10 described with reference to FIG. 3. For example, the user can set the document size, the printing form of one side/dual side, magnification, print out sheet, consolidation mode (2-in-1, 4-in-1), and the like. The document size may be automatically detected by a sensor arranged at scanner 13 or document tray 17.

Then, a magnification set process is executed according to the copy mode setting (step S54). Specifically, control unit 20 executes the processes of determining the transportation roller transportation speed, the slider moving speed, the magnification in the electronic variable scale magnification process, and the like according to the copy operation setting accepted at step S54 and various parameters stored in ROM 30. Details thereof will be described afterwards.

Then, a determination is made as to whether the start key is depressed or not (step S56).

When the start key is depressed (YES at step S56), an image scanning process is performed in accordance with the setting of the magnification setting process (step S58). A printing process is executed based on the scanned image (step S60). In other words, a copy operation is initiated. When the copy operation ends, control returns to step S52 to accept a copy operation setting from a user.

When the start key is not depressed (NO at step S56), control returns to step S52 to accept a copy operation setting from a user.

The contents of the magnification setting process carried out at step S54 in the flowchart of FIG. 17 will be described based on FIG. 18. A program to implement the relevant magnification setting process is prestored in ROM 30. Control unit 20 reads out and executes the relevant program for execution of the process set forth below.

Figure 18:
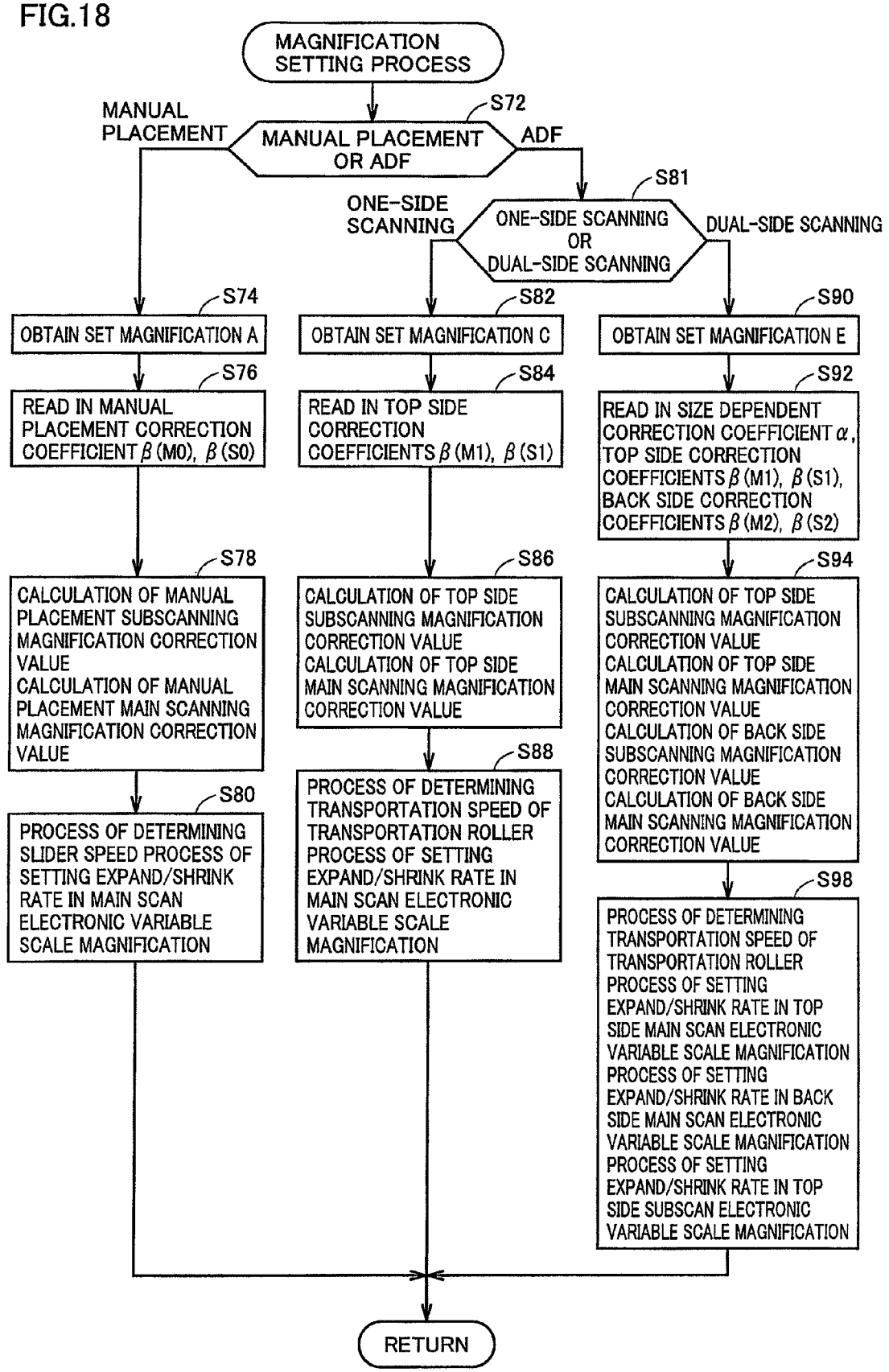
FIG. 18 is a flowchart for describing a magnification setting process executed at step S54 in the flowchart of FIG. 17.

Referring to FIG. 18, first a determination is made as to whether in manual placement scanning or ADF scanning (step S72). The determination of manual placement scanning is made by detecting whether a document is placed on platen glass 132 through a sensor installed at scanner 13. The determination of ADF scanning is made by detecting whether a document is placed on document tray 17 through a sensor installed at document tray 17.

When a determination is made of manual placement scanning at step S72 (manual placement at step S72), a set magnification A is obtained (step S74).

Control unit 20 obtains a set magnification A entered by a user. Set magnification A is constituted of set magnification AM in the main scanning direction and set magnification AS in the subscanning direction of a document. As used herein "set magnification entered by a user" includes a magnification directly selected by a user, as well as a magnification automatically determined by control unit 20 in response to accepting selection of a consolidation function (for example 2-in-1), followed by a selection corresponding to 2-in-1.

Then, manual placement main scanning correction coefficient β (M0) and manual placement subscanning correction coefficient β (S0) are read out from the ROM (step S76).

Then, the manual placement main scanning magnification correction value and manual placement subscanning magnification correction value are calculated (step S78). Specifically, main scanning set magnification AM and manual placement main scanning correction coefficient β (M0) are inserted into equation (15) to calculate the manual placement main scanning magnification correction value. Further, the manual placement subscanning magnification correction value is calculated by inserting subscanning set magnification AS and manual placement subscanning correction coefficient β (S0) into equation (13).

Then, a process of determining the slider moving speed based on the manual placement subscanning magnification correction value calculated at step S78 and a process of setting the expand/shrink rate in electronic variable scale magnification in the main scanning direction based on the manual placement main scanning magnification correction value are executed (step S80). The slider moving speed is determined based on equation (14). For the expand/shrink rate of the electronic variable scale magnification process in the main scanning direction, the manual placement main scanning magnification correction value is directly set.

Then, the process ends (return) to the flowchart of FIG. 17 to effect an image scanning process by manual placement scanning (step S58). In an image scanning process, the slider is moved at the slider moving speed determined at step S80 of FIG. 18, and an electronic variable scale magnification process in the main scanning direction is performed based on the expand/shrink rate set at step S80.

Thus, deviation in the scanning magnification in the main scanning direction and subscanning direction due to machinery difference variation in the mechanism related to manual placement scanning is corrected based on manual placement main scanning correction coefficient β (M0) and manual placement subscanning correction coefficient β (S0). Deviation in the scanning magnification in the main scanning direction is corrected by the electronic variable scale magnification process in the main scanning direction with respect to the scanned image. Deviation in the scanning magnification in the subscanning direction is corrected by altering the slider moving speed.

Thus, correction to an appropriate scanning magnification can be made even if there is machinery difference variation in the mechanism related to manual placement scanning. Since correction of the scanning magnification in the subscanning direction is made by altering the slider moving speed, degradation in the picture quality caused by the electronic variable scale magnification process in the subscanning direction can be prevented to allow a scanned image of high picture quality. Furthermore, since an electronic variable scale magnification process in the subscanning direction is not carried out, the scale of the image processing unit (first image processing unit 143) can be made smaller to allow reduction in the cost of MFP 1. Further, since an electronic variable scale magnification process in the subscanning direction is not carried out, degradation in the performance of the image scanning process can be prevented to allow image scanning at high speed.

Returning to the flowchart of FIG. 18, when a determination is made of ADF scanning at step S72 (ADF at step S72), a determination is made of one-side scanning or dual side scanning (step S81). This determination is made based on whether the user has selected one-side scanning or dual side scanning via operation panel 10.

When a determination is made that one-side scanning is set (one-side scanning at step S81), control proceeds to step S82 to obtain a set magnification C that is set by a user. Set magnification C is constituted of set magnification CM in the subscanning direction and set magnification CS in the subscanning direction of a document. As used herein "set magnification that is entered by a user" includes a magnification directly selected by a user, as well as a magnification automatically determined by control unit 20 in response to accepting selection of a consolidation function (for example 2-in-1), followed by a selection corresponding to 2-in-1.

Then, top side main scanning correction coefficient β (M1) and top side subscanning correction coefficient β (S1) are read from ROM 30 (step S84).

The top side main scanning magnification correction value and top side subscanning magnification correction value are calculated (step S86). Specifically, main scanning set magnification CM and top side main scanning correction coefficient β (M1) are inserted into equation (18) to calculate the top side main scanning magnification correction value. Further, the top side subscanning magnification correction value is calculated by inserting subscanning set magnification CS and top side subscanning correction coefficient β (S1) into equation (16).

Then, the process of determining the document transportation speed based on the top side subscanning magnification correction value calculated at step S86, and the process of setting the expand/shrink rate in electronic variable scale magnification in the main scanning direction based on the top side main scanning magnification correction value are executed (step S88). The document transportation speed is determined based on equation (17). For the expand/shrink rate in electronic variable scale magnification in the main scanning direction, the top side main scanning magnification correction value is directly set.

Then, the process ends (return) to the flowchart of FIG. 17 to effect an image scanning process by ADF one-side scanning (step S58). In an image scanning process, the document is moved at the document transportation speed determined at step S88 of FIG. 18, and an electronic variable scale magnification process in the main scanning direction is performed based on the expand/shrink rate set at step S88.

Thus, deviation in the scanning magnification in the main scanning direction and subscanning direction due to machinery difference variation in the mechanism related to ADF top side scanning is corrected based on top side main scanning correction coefficient β (M1) and top side subscanning correction coefficient β (S1). Deviation in the scanning magnification in the main scanning direction is corrected by the electronic variable scale magnification process in the main scanning direction with respect to the scanned image. Deviation in the scanning magnification in the subscanning direction is corrected by altering the document transportation speed.

Thus, correction to an appropriate scanning magnification can be made even if there is machinery difference variation in the mechanism related to ADF top side scanning. Since correction of the scanning magnification in the subscanning direction is made by altering the document transportation speed, degradation in the picture quality caused by an electronic variable scale magnification process in the subscanning direction can be prevented to allow a scanned image of high picture quality. Furthermore, since an electronic variable scale magnification process in the subscanning direction is not carried out, the scale of the image processing unit (first image processing unit 143) can be made smaller to allow reduction in the cost of MFP 1. Further, since an electronic variable scale magnification process in the subscanning direction is not carried out, degradation in the performance of the image scanning process can be prevented to allow image scanning at high speed.

Returning to the flowchart of FIG. 18, when a determination is made of dual side scanning at step S81 (dual side scanning at step S81), control proceeds to step S90 to obtain a set magnification E that is set by a user. Set magnification E is constituted of set magnification EM in the main scanning direction and set magnification ES in the subscanning direction of a document. As used herein "set magnification that is entered by a user" includes a magnification directly selected by a user, as well as a magnification automatically determined by control unit 20 in response to accepting selection of a consolidation function (for example 2-in-1), followed by a selection corresponding to 2-in-1.

Then, size dependent correction coefficient α corresponding to the set document size, top side main scanning correction coefficient β (M1), top side subscanning correction coefficient β (S1), back side main scanning correction coefficient β (M2) and back side subscanning correction coefficient β (S2) are read from the ROM (step S92).

The top side main scanning magnification correction value, top side subscanning magnification correction value, back side main scanning magnification correction value, and back side subscanning magnification correction value are calculated (step S94).

Specifically, main scanning set magnification EM and top side main scanning correction coefficient β (M1) are inserted into equation (23) to calculate the top side main scanning magnification correction value. Further, the back side main scanning magnification correction value is calculated by inserting main scanning set magnification EM and back side main scanning correction coefficient β (M2) into equation (21).

Although the back side subscanning magnification correction value is calculated by inserting subscanning set magnification ES and back side subscanning correction coefficient β (S2) into equation (19), it is to be noted that equation (19) corresponds to a document size of a reference document (A4L). In other words, when the document is of a size other than that of the reference document (A4L), the subscanning set magnification is corrected based on subscanning set magnification ES, back side scanning correction coefficient β (S2), and a correction coefficient corresponding to the size (size dependent correction coefficient α) to calculate the back side subscanning magnification correction value, as in equation (24).

Back side subscanning magnification correction value=(subscanning set magnification)×(back side subscanning correction coefficient β(S2)× (size dependent correction coefficient α) (24)

In other words, equation (24) has the correction based on size dependent correction coefficient α corresponding to the document size added to equation (19) for the purpose of correcting deviation in the back side subscanning magnification value due to a difference in the document size.

Although the top side subscanning magnification correction value is calculated by inserting subscanning set magnification ES and top side subscanning correction coefficient β (S1) into equation (22), it is to be noted that equation (22) corresponds to a document size of a reference document (A4L). In other words, when the document is of a size other than that of the reference document (A4L), the subscanning set magnification is corrected based on subscanning set magnification ES, top side subscanning correction coefficient β (S1), and a correction coefficient corresponding to the size (size dependent correction coefficient α) to calculate the top side subscanning magnification correction value, as in equation (25).

Top side subscanning magnification correction value= (subscanning set magnification)×(top side subscanning correction coefficient β(S1))÷(back side subscanning correction coefficient β(S2))/(size dependent correction coefficient α corresponding to document size) (25)

In other words, equation (22) has the correction based on size dependent correction coefficient α corresponding to the document size added to equation (22) for the purpose of correcting deviation in the top side subscanning magnification value due to a difference in the document size.

Then, a process of setting the expand/shrink rate in electronic variable scale magnification in the main scanning direction of the top side based on the top side main scanning magnification correction calculated at step S94, a process of setting the expand/shrink rate in electronic variable scale magnification in the main scanning direction of the back side based on the back side main scanning magnification correction value, a process of determining the document transportation speed based on the back side subscanning magnification correction value, and a process of setting the expand/shrink rate in the electronic variable scale magnification based on the top side subscanning magnification correction value are executed (step S98).

For the expand/shrink rate in electronic variable scale magnification in the main scanning direction of the top side, the expand/shrink rate in electronic variable scale magnification in the subscanning direction of the top side, and the expand/shrink rate in electronic variable scale magnification in the main scanning direction of the back side, the top side main scanning magnification correction value, top side subscanning magnification correction value, and back side main scanning magnification correction value, respectively, are directly set. The document transportation speed is determined based on equation (20).

Then, the process ends (return) to the flowchart FIG. 17 to effect an image scanning process in dual-side scanning (step S58). In an image scanning process: the document is transported at the document transportation speed determined at step S98 in FIG. 18; an electronic variable scale magnification process on the top side scanned image in the main scanning direction and subscanning direction is carried out based on the expand/shrink rate set at step S98; and an electronic variable scale magnification process on the back side scanned image in the main scanning direction are carried out. Since the subscanning magnification of the top side becomes greater than that of the back side due to a difference in the document transportation speed at the scanning positions, the electronic variable scale magnification process in the subscanning direction on the top side scanned image is a shrinkage process (decimation process).

Thus, in a dual-side scanning mode, deviation in the scanning magnification in the main scanning direction due to machinery difference variation in the mechanism related to top side scanning is corrected based on top side main scanning correction coefficient $\beta$ (M1). Further, deviation in the scanning magnification in the subscanning direction due to machinery difference variation in the mechanism related to top side scanning and size variation is corrected based on top side subscanning correction coefficient $\beta$ (S1), back side subscanning correction coefficient $\beta$ (S2), and size dependent correction coefficient $\alpha$. Moreover, deviation in the scanning magnification in the main scanning direction caused by machinery difference variation in the mechanism related to back side scanning is corrected based on back side main scanning correction coefficient $\beta$ (M2). Further, deviation in scanning magnification in the subscanning direction due to machinery difference variation in the mechanism related to back side scanning and size variation is corrected based on back side subscanning correction coefficient $\beta$ (S2) and size dependent correction coefficient $\alpha$.

Deviation in the scanning magnification in the main scanning direction of the top side is corrected by an electronic variable scale magnification process in the main scanning direction on the top side scanned image. Deviation in the scanning magnification in the subscanning direction of a top side is corrected by an electronic variable scale magnification process in the subscanning direction on the top side scanned image. Deviation in the scanning magnification in the main scanning direction of the back side is corrected by an electronic variable scale magnification process in the main scanning direction on the back side scanned image. Deviation in the scanning magnification in the subscanning direction of the back side is corrected by altering the document transportation speed.

Thus, even in the case where machinery difference variation occurs at the mechanism related to top side scanning and the mechanism related to back side scanning in a dual-side scanning mode, the scanning magnification can be corrected to an appropriate scanning magnification. Furthermore, since the electronic variable scale magnification process in the subscanning direction is constantly a decimation process (shrinkage process), and an inflate process (enlargement process) in the subscanning direction by an electronic variable scale magnification process is not required, image scanning can be performed at high speed without degradation in the performance of the image scanning process. Moreover, since an electronic variable scale magnification process in the subscanning direction is applied to only the top side scanned image and an electronic variable scale magnification process in the subscanning direction is not applied to a back side scanning image, degradation in picture quality caused by an electronic variable scale magnification process in the subscanning direction can be minimized. Furthermore, since an inflate process (enlargement process) by an electronic variable scale magnification process in the subscanning direction is not required, the scale of the image processing unit (second image processing unit 145) can be made smaller to allow reduction in the cost of MFP 1.

Thus, MFP 1 has the scanning magnification in the main scanning direction corrected by an electronic variable scale magnification and the scanning magnification in the subscanning direction is corrected by altering the slider moving speed in manual placement scanning. In ADF one-side scanning, the scanning magnification in the main scanning direction is corrected by an electronic variable scale magnification process, and the scanning magnification in the subscanning direction is corrected by altering the document transportation speed. In dual-side scanning, the scanning magnification in the main scanning direction and the scanning magnification in the subscanning direction of the top side are corrected by an electronic variable scale magnification process, whereas the scanning magnification in the subscanning direction of the back side is corrected by altering the document transportation speed. Further, the electronic variable scale magnification process is always a decimation process (shrinkage process) since the scanning magnification in the subscanning direction of the top side is corrected.

Namely, with regard to a scanned image obtained by manual placement scanning, one-side scanning, and dual-side scanning, only the top side scanned image in a dual-side scanning mode is subjected to an electronic variable scale magnification process in the subscanning direction. Therefore, reduction in picture quality caused by an electronic variable scale magnification process in the subscanning direction can be minimized. Furthermore, since the electronic variable scale magnification process in the subscanning direction is always a decimation (shrinkage process), and an inflate process (enlargement process) in the subscanning direction by an electronic variable scale magnification process is not required, an image can be scanned at high speed without degradation in the performance in the image scanning process.

Thus, according to MFP 1, degradation in picture quality can be minimized without reducing the performance in an image scanning process.

By way of example, the above embodiment was described in which a magnification set process is executed to correct a scanning magnification in the main scanning direction that varies due to machinery difference variation by a main scanning magnification setting process of the top side and back side, and a setting process of a transportation speed of transportation rollers in a dual-side document is executed to correct the scanning magnification of a scanned image that varies due to a difference in the transportation speed at scanning positions and machinery difference variation, in the case where a copy function of MFP 1 is utilized. The same applies to the case where a scan function based on scanner 13 alone and a facsimile function based on facsimile 16 are used.

The flowchart of FIG. 18 was described based on the case where deviation in the top side subscanning magnification value due to a difference in the document size is corrected based on a size dependent correction coefficient α in dual-side scanning. It is to be noted that correction based on size dependent correction coefficient α is not required in the case of a reference document (A4L). Furthermore, since such deviation due to a difference in the document size is relatively not so great as compared to other deviations, the correction based on size dependent correction coefficient α may not be executed.

Modification 1

4. Correction in View of Document Thickness

A first modification of the present embodiment will be described based on correction in consideration of machinery difference variation set forth above and document thickness.

The thickness of a document was not particularly taken into consideration in the above description. However, the scanning magnification may vary due to variation in the thickness of a document.

A top side subscanning magnification of a top side scanning image according to variation in the document thickness will be described based on FIG. 19. The present example corresponds to the case where ADF one-side scanning is carried out based on a reference document (A4L) having a thickness of 128 ($g/m^2$).

Figure 19:
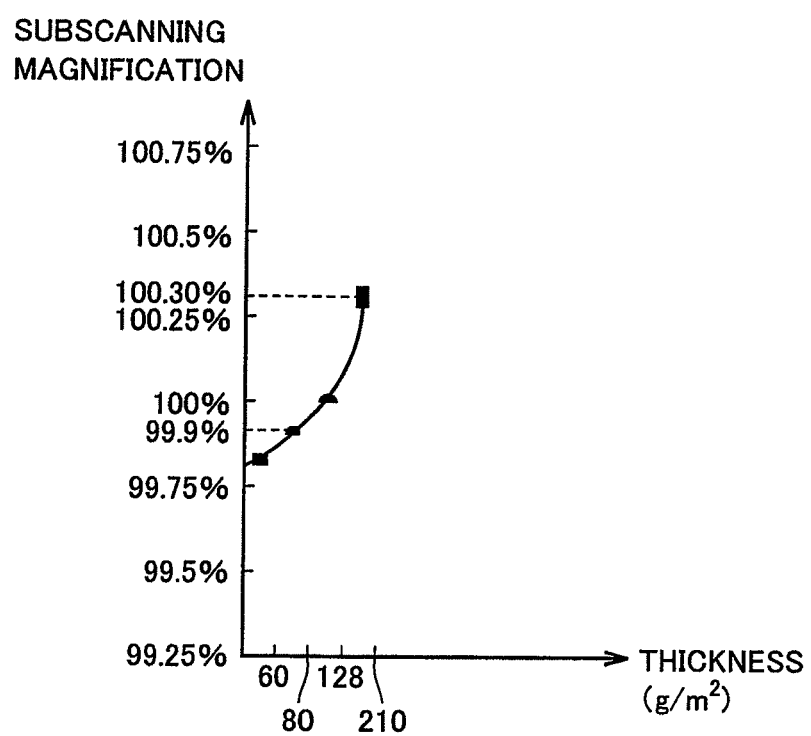
FIG. 19 is a diagram for describing a scanning magnification in top side subscanning of a top side scanned image according to variation in document thickness.

FIG. 19 represents the case where the scanning magnification becomes higher as the thickness of a document becomes greater than 128 ($g/m^2$), whereas the scanning magnification becomes smaller as a function of thinner document when the thickness is less than 128 ($g/m^2$).

Therefore, a process to correct variation in the scanning magnification caused by variation in such thickness is required.

The first modification of the present embodiment is directed to correcting the scanning magnification by using a correction coefficient γ to correct variation in thickness corresponding to the thickness of a document, referenced to a reference document (A4L) having a thickness 128 ($g/m^2$).

First, the ratio of a top side subscanning magnification for a reference document (A4L) of thickness 128 ($g/m^2$) to each thickness of a reference document (A4L) is obtained.

Specifically, since the top side subscanning magnification of a reference document (A4L) of thickness 210 ($g/m^2$) is 100.30% and the top side subscanning magnification of a reference document (A4L) of thickness 128 ($g/m^2$) is 100.00%, the ratio in top side subscanning magnification of the reference document (A4L) of thickness 210 ($g/m^2$) to the reference document (A4L) of thickness 128 ($g/m^2$) becomes 100.30%. This means that the top side subscanning magnification of a reference document (A4L) of thickness 210 ($g/m^2$) becomes 100.30% when the document is transported at a transportation speed that causes the top side subscanning magnification of a reference document (A4L) of thickness 128 ($g/m^2$) to attain 1×

Furthermore, since the top side subscanning magnification of a reference document (A4L) of thickness 80 ($g/m^2$) is 99.90% and the top side subscanning magnification of a reference document (A4L) of thickness 128 ($g/m^2$) is 100.00%, the ratio in top side subscanning magnification of the reference document (A4L) of thickness 80 ($g/m^2$) to the reference document (A4L) of thickness 128 ($g/m^2$) becomes 99.90%. The same calculation applies to other document sizes.

When reference transportation speed Vr0 is corrected in accordance with a reference document (A4L) of thickness 128 ($g/m^2$), the top side subscanning magnification of a reference document (A4L) of thickness 128 ($g/m^2$) attains 1×, but not for a document of a size other than that of reference document (A4L) of thickness 128 ($g/m^2$). This is because the document transportation speed differs according to the thickness of the document in the subscanning direction.

Thus, the subscanning set magnification is corrected such that the top side scanned image attains equal-scale magnification for document sizes differing in thickness based on the ratio in the top side subscanning magnification of a reference document (A4L) of thickness 128 ($g/m^2$) with respect to each document thickness.

Specifically, a reciprocal of the ratio of the top side subscanning magnification to a reference document (A4L) of thickness 128 ($g/m^2$) is employed as a correction coefficient (thickness dependent correction coefficient γ).

Since the ratio of the top side subscanning magnification of reference document (A4L) of thickness 210 ($g/m^2$) to reference document (A4L) of thickness 128 ($g/m^2$) is 100.30%, the thickness dependent correction coefficient γ becomes 99.70% (=100/100.30). Similarly, since the ratio of the top side subscanning magnification of reference document (A4L) of thickness 80 ($g/m^2$) to reference document (A4L) of thickness 128 ($g/m^2$) is 99.90%, the thickness dependent correction coefficient γ becomes 100.10% (=100/99.90). A similar calculation applies to other document sizes.

Thickness dependent correction coefficients γ corresponding to document thickness in association with a reference document (A4L) of other thicknesses, referenced to a reference document (A4L) having a thickness 128 ($g/m^2$), are prestored in the form of a data table in ROM 30. The graph shown in FIG. 19 may be stored in ROM 30 as an approximate expression to allow calculation of thickness dependent correction coefficient γ by substituting the document thickness into the approximate expression.

In the case of ADF one-side scanning, the subscanning set magnification is corrected based on top side subscanning correction coefficient β (S1) and thickness dependent correction coefficient γ to calculate the top side subscanning magnification correction value in association with the subscanning direction. Then, the document transportation speed is determined based on the top side subscanning magnification correction value.

Specifically, the top side subscanning magnification correction value is obtained by equation (26).

Top side subscanning magnification correction value= (subscanning set magnification)×(top side subscanning correction coefficient β(S1))×(thickness dependent correction coefficient γ corresponding to document thickness)  (26)

By inserting the top side subscanning magnification correction value obtained by equation (26) into equation (17), the document transportation speed is determined.

By scanning an image at the document transportation speed (Vr1) calculated at equation (17), the subscanning magnification in one-side scanning by ADF scanning attains 1×.

The top side main scanning magnification correction value is similar to that described in association with equation (18).

Thus, in ADF one-side scanning for a reference document differing in thickness, the top side subscanning magnification is corrected by a correction coefficient according to the document thickness (thickness dependent correction coefficient γ), and the document transportation speed is set such the top side subscanning magnification attains 1× to allow an image of equal-scale magnification to be obtained without an electronic variable scale magnification in the subscanning direction for a top side scanned image.

Although the above-described embodiment is based on ADF one-side scanning, the same applies to dual-side scanning.

In dual-side scanning, the subscanning set magnification is corrected based on back side subscanning correction coefficient β (S2) and thickness dependent correction coefficient γ in association with the subscanning direction of a back side scanned image to calculate the back side subscanning magnification correction value. The document transportation speed is determined by the back side subscanning magnification correction value.

Specifically, the back side subscanning magnification correction value is obtained by equation (27).

Back side subscanning magnification correction value=(subscanning set magnification)×(back side subscanning correction coefficient β(S2))× (thickness dependent correction coefficient γ corresponding to document thickness) (27)

By inserting the back side subscanning magnification correction value obtained by equation (27) into equation (20), the document transportation speed is determined.

By transporting the document at a document transportation speed calculated at equation (20), the subscanning magnification of a back side scanning image in a dual-side scanning mode attains 1×.

In the case of dual-side scanning, the top side subscanning set magnification is corrected based on top side subscanning correction coefficient β (S1), back side scanning correction coefficient β (S2), and thickness dependent correction coefficient γ to calculate a top side subscanning magnification correction value. The correction process is effected by applying an electronic variable scale magnification process (decimation process) based on the top side subscanning magnification correction value.

Specifically, the top side subscanning magnification correction value is obtained by equation (28).

Top side subscanning magnification correction value= (subscanning set magnification)×(top side subscanning correction coefficient β(S1))÷(back side subscanning correction coefficient β(S2)/(thickness dependent correction coefficient γ) (28)

Based on the top side subscanning magnification correction value obtained by equation (28), an electronic variable scale magnification process (decimation process) in the subscanning direction is applied to the top side scanning image. Accordingly, the subscanning magnification of a top-side scanned image by scanning attains 1×.

The main scanning magnification correction values of the top side and back side are similar to those described with reference to equations (21) and (23).

Thus, in the case of dual-side scanning for a reference document differing in thickness, the back side subscanning magnification is corrected by a correction coefficient (thickness dependent correction coefficient γ) corresponding to the document thickness, and the transportation speed of the document is set such that the back side scanning magnification attains 1×. An image of equal-scale magnification can be obtained without applying an electronic variable scale magnification in the subscanning direction for a back side scanned image. Further, an image of equal-scale magnification can be obtained by electronic decimation of the top side scanned image in the subscanning direction.

The flow of the process when a copy function is executed at MFP 1 according to a first modification of the present embodiment is similar to that described with reference to FIG. 17. Therefore, detailed description thereof will not be repeated.

The contents of a magnification set process according to the first modification of an embodiment of the present invention will be described based on FIG. 20. A program to implement the relevant magnification setting process is prestored in ROM 30. Control unit 20 reads out and executes the relevant program to effect the process set forth below.

Figure 20:
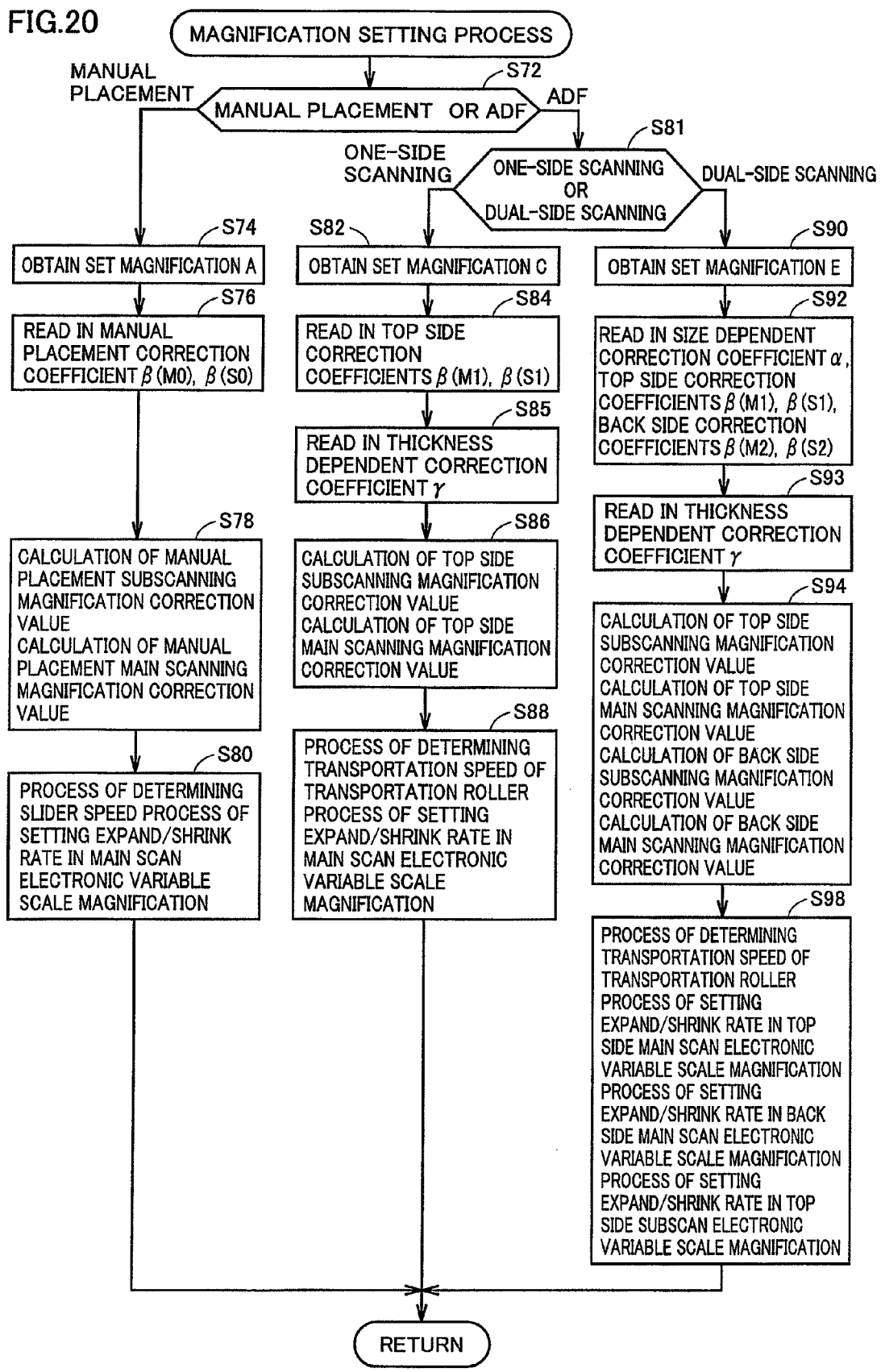
FIG. 20 is flowchart of a magnification setting process according to a first modification of an embodiment of the present invention.

The flowchart of FIG. 20 differs from the flowchart of FIG. 18 in that step S85 and step S93 are added. The process to steps S72 to step S81 are similar to those described in association with FIG. 18.

When a determination is made that one-side scanning is set (one-side scanning at step S81), control proceeds to step S82 to obtain a set magnification C that is set by a user.

Then, top side main scanning correction coefficient β (M1) and top side subscanning correction coefficient β (S1) are read out from the ROM (step S84).

Then, thickness dependent correction coefficient γ is read out from the ROM (step S85). Specifically, according to the value of a document thickness entered by a user through operation panel 10, thickness dependent correction coefficient γ is read in by referring to a data table storing thickness dependent correction coefficients γ according to a document thickness related to a reference document (A4L) of another thickness, referenced to a reference document (A4L) of thickness 128 (g/m$^2$), as set forth above.

Then, the top side main scanning magnification correction value and top side subscanning magnification correction value are calculated (step S86). Specifically, main scanning set magnification CM and top side main scanning correction coefficient β (M1) are inserted into equation (18) to calculate a top side main scanning magnification correction value. Also, subscanning set magnification CS and top side subscanning correction coefficient β (S1) are inserted into equation (26) to calculate a top side subscanning magnification correction value.

Then, a process of determining the document transportation speed based on the top side subscanning magnification correction value calculated at step S86 and a process of setting the expand/shrink rate in electronic variable scale magnification in the main scanning direction based on the top side main scanning magnification correction value are executed (step S88). The document transportation speed is determined based on equation (17). For the expand/shrink rate of the electronic variable scale magnification process in the main scanning direction, the top side main scanning magnification correction value is directly set.

Then, the process ends (return) to the flowchart of FIG. 17 to effect an image scanning process by ADF one-side scanning (step S58). In an image scanning process, the document is moved at the document transportation speed determined at step S88 of FIG. 18, and an electronic variable scale magnification process in the main scanning direction is performed based on the expand/shrink rate set at step S88.

Thus, deviation in the scanning magnification in the main scanning direction due to machinery difference variation in the mechanism related to ADF top side scanning is corrected based on top side main scanning correction coefficient β (M1). Deviation in the scanning magnification in the subscanning direction due to machinery difference variation and thickness variation is corrected based on top side subscanning correction coefficient β (S1) and thickness dependent correction coefficient γ. Deviation in the scanning magnification in the main scanning direction is corrected by the electronic variable scale magnification process in the main scanning direction with respect to the scanned image. Deviation in the scanning magnification in the subscanning direction is corrected by altering the document transportation speed.

Thus, correction to an appropriate scanning magnification can be made even if there is machinery difference variation in the mechanism related to ADF top side scanning and thickness variation. Since correction of the scanning magnification in the subscanning direction is made by altering the document transportation speed, degradation in the picture quality caused by the electronic variable scale magnification process in the subscanning direction can be prevented to allow a scanned image of high picture quality. Furthermore, since an electronic variable scale magnification process in the subscanning direction is not carried out, the scale of the image processing unit (first image processing unit 143) can be made smaller to allow reduction in the cost of MFP 1. Further, since an electronic variable scale magnification process in the subscanning direction is not carried out, degradation in the performance of the image scanning process can be prevented to allow image scanning at high speed.

Returning to the flowchart of FIG. 20, when a determination is made of dual-side scanning at step S81 (dual-side scanning at step S81), control proceeds to step S90 to obtain set magnification E that is set by a user. Then, size dependent correction coefficient α corresponding to the set document size, top side main scanning correction coefficient β (M1), top side subscanning correction coefficient β (S1), back side main scanning correction coefficient β (M2), and back side subscanning correction coefficient (S2) are read from the ROM.

Then, thickness dependent correction coefficient γ is read out from the ROM (step S93). Specifically, according to the value of thickness of a document entered by a user through operation panel 10, thickness dependent correction coefficient γ is read in by referring to a data table storing thickness dependent correction coefficients γ according to a document thickness related to a reference document (A4L) of another thickness, referenced to a reference document (A4L) of thickness 128 (g/m$^2$), as set forth above.

The top side main scanning magnification correction value, top side subscanning magnification correction value, back side main scanning magnification correction value, and back side subscanning magnification correction value are calculated (step S94).

Specifically, main scanning set magnification EM and top side main scanning correction coefficient β (M1) are inserted into equation (23) to calculate the top side main scanning magnification correction value. Further, the back side main scanning magnification correction value is calculated by inserting main scanning set magnification EM and back side main scanning correction coefficient β (M2) into equation (21).

Although the back side subscanning magnification correction value is calculated by inserting subscanning set magnification ES and back side subscanning correction coefficient β (S2) into equation (27), it is to be noted that equation (27) corresponds to a document size of a reference document (A4L). In other words, when the document is of a size other than that of the reference document (A4L), the subscanning set magnification is corrected based on subscanning set magnification ES, back side subscanning correction coefficient β (S2), thickness dependent correction coefficient γ, and a correction coefficient corresponding to the size (size dependent correction coefficient α) to calculate the back side subscanning magnification correction value, as in equation (29).

Back side subscanning magnification correction value=(subscanning set magnification)×(back side subscanning correction coefficient β(S2)×(thickness dependent correction coefficient γ corresponding to document thickness)×(size dependent correction coefficient α) (29)

In other words, equation (27) has the correction based on size dependent correction coefficient α corresponding to the document size added to equation (27) for the purpose of correcting deviation in the back side subscanning magnification value due to a difference in the document size.

Although the top side subscanning magnification correction value is calculated by inserting subscanning set magnification ES, top side subscanning correction coefficient β (S1) and thickness dependent correction coefficient γ into equation (28), it is to be noted that equation (28) corresponds to a document size of a reference document (A4L). In other words, when the document is of a size other than that of the reference document (A4L), the subscanning set magnification is corrected based on subscanning set magnification ES, top side subscanning correction coefficient β (S1), thickness dependent correction coefficient γ, and a correction coefficient corresponding to the size (size dependent correction coefficient α) to calculate the top side subscanning magnification correction value, as in equation (30).

Top side subscanning magnification correction value= (subscanning set magnification)×(top side subscanning correction coefficient β(S1))÷(back side subscanning correction coefficient β(S2))/(thickness dependent correction coefficient γ)/(size dependent correction coefficient α corresponding to document size) (30)

In other words, equation (28) has the correction based on size dependent correction coefficient α corresponding to the document size added for the purpose of correcting deviation in the top side subscanning magnification value due to a difference in the document size.

Then, a process of setting the expand/shrink rate in electronic variable scale magnification in the main scanning direction of the top side based on the top side main scanning magnification correction value calculated at step S94, a process of setting the expand/shrink rate in electronic variable scale magnification in the main scanning direction of the back side based on the back side main scanning magnification correction value, a process of determining the document transportation speed based on the back side subscanning magnification correction value, and a process of setting the expand/shrink rate in the electronic variable scale magnification based on the top side subscanning magnification correction value are executed (step S98).

For the expand/shrink rate in electronic variable scale magnification in the main scanning direction of the top side, the expand/shrink rate in electronic variable scale magnification in the subscanning direction of the top side, and the expand/shrink rate in electronic variable scale magnification in the main scanning direction of the back side, the top side main scanning magnification correction value, top side subscanning magnification correction value, and back side main scanning magnification correction value, respectively, are directly set. The document transportation speed is determined based on equation (20).

Then, the process ends (return) to the flowchart FIG. 17 to effect an image scanning process in dual-side scanning (step S58). In an image scanning process: the document is transported at the document transportation speed determined at step S98 in FIG. 18; an electronic variable scale magnification process on the top side scanned image in the main scanning direction and subscanning direction is carried out based on the expand/shrink rate set at step S98; and an electronic variable scale magnification process on the back side scanned image in the main scanning direction are carried out.

Thus, in a dual-side scanning mode, deviation in the scanning magnification in the main scanning direction due to machinery difference variation in the mechanism related to top side scanning is corrected based on top side main scanning correction coefficient β (M1). Further, deviation in the scanning magnification in the subscanning direction due to machinery difference variation in the mechanism related to top side scanning and thickness variation is corrected based on top side subscanning correction coefficient β (S1), back side subscanning correction coefficient β (S2), thickness dependent correction coefficient γ, and size dependent correction coefficient α. Moreover, deviation in the scanning magnification in the main scanning direction caused by machinery difference variation in the mechanism related to back side scanning is corrected based on back side main scanning correction coefficient β (M2). Further, deviation in scanning magnification in the subscanning direction due to machinery difference variation in the mechanism related to back side scanning and thickness variation is corrected based on back side subscanning correction coefficient β (S2), size dependent correction coefficient α and thickness dependent correction coefficient γ.

Thus, even in the case where machinery difference variation occurs at the mechanism related to top side scanning and the mechanism related to back side scanning, as well as document thickness variation in a dual-side scanning mode, the scanning magnification can be corrected to an appropriate scanning magnification. Furthermore, since the electronic variable scale magnification process in the subscanning direction is constantly a decimation process (shrinkage process), and an inflate process (enlargement process) in the subscanning direction by an electronic variable scale magnification process is not required, image scanning can be performed at high speed without degradation in the performance of the image scanning process. Moreover, since an electronic variable scale magnification process in the subscanning direction is applied to only the top side scanned image and an electronic variable scale magnification process in the subscanning direction is not applied to a back side scanning image, degradation in picture quality caused by an electronic variable scale magnification process in the subscanning direction can be minimized. Furthermore, since an inflate process (enlargement process) by an electronic variable scale magnification process in the subscanning direction is not required, the scale of the image processing unit (second image processing unit 145) can be made smaller to allow reduction in the cost of MFP 1.

Second Modification

The second modification according to an embodiment is directed to a scheme of further determining the absence/presence of execution of an electronic variable scale magnification process (decimation process) in the sub scanning direction of a top side scanned image according to a top side sub scanning magnification correction value in dual-side scanning in a magnification setting process.

It may be desirable to not execute an electronic variable scale magnification process (decimation process) in a subscanning direction of a top side scanned image when priority is given in the picture quality since an electronic variable scale magnification process will lead to degradation in the picture quality.

Therefore, in a case where the scanning magnification difference between a top side scanned image and a back side scanned image becomes smaller according to change in the scanning magnification caused by machinery difference variation in dual-side scanning, it may be desirable to not execute an electronic variable scale magnification (decimation process) in the subscanning direction in a top side scanned image to give priority to picture quality.

Figure 21:
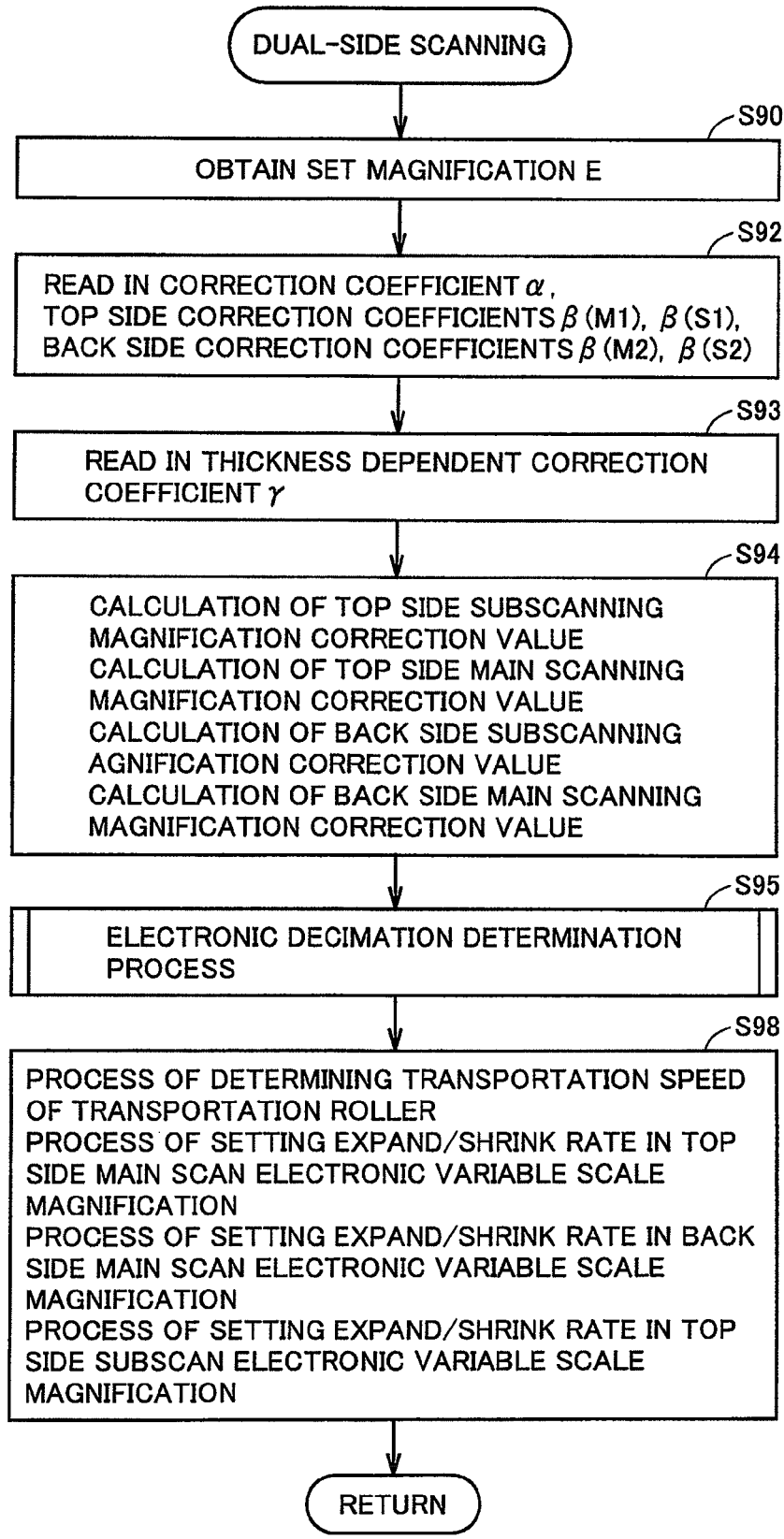
FIG. 21 is a flowchart of a magnification setting process in dual-side scanning according to a second modification of an embodiment of the present invention.

Thus, the second modification of the present embodiment will be described based on a scheme implemented such that the electronic variable scale magnification process (decimation process) in the subscanning direction of a top side scanned image is not executed when the difference between the scanning magnification of the top side scanned image and the scanning magnification of the back side scanned image is small, and executing the electronic variable scale magnification process (decimation process) in the subscanning direction of a top side scanned image when the difference between the scanning magnification of the top side scanned image and the scanning magnification of the back side scanned image is great, in consideration of a machinery difference correction coefficient used to correct variation in the scanning magnification caused by machinery difference variation A magnification set process in dual-side scanning according to the second modification of the present embodiment will be described based on FIG. 21. A program to realize the magnification setting process in dual-side scanning is prestored in ROM 30. Control unit 20 reads out and executes the relevant program for execution of the process set forth below.

The flowchart of FIG. 21 differs from the flowchart of the magnification setting process in dual-side scanning described with reference to FIG. 20 in that a step S95 of determining absence/presence of execution of an electronic variable scale magnification (decimation process) (also referred to as "electronic decimation determination process") is added. The remaining processing is similar to that in the flow chart of FIG. 20. Therefore, detailed description thereof will not be repeated.

An electronic decimation determining process according to the second modification of the present embodiment will be described based on FIG. 22. A program to realize the relevant electronic decimation determination process is prestored in ROM 30. Control unit 20 reads out and executes the relevant program for execution of the process set forth below.

Figure 22:
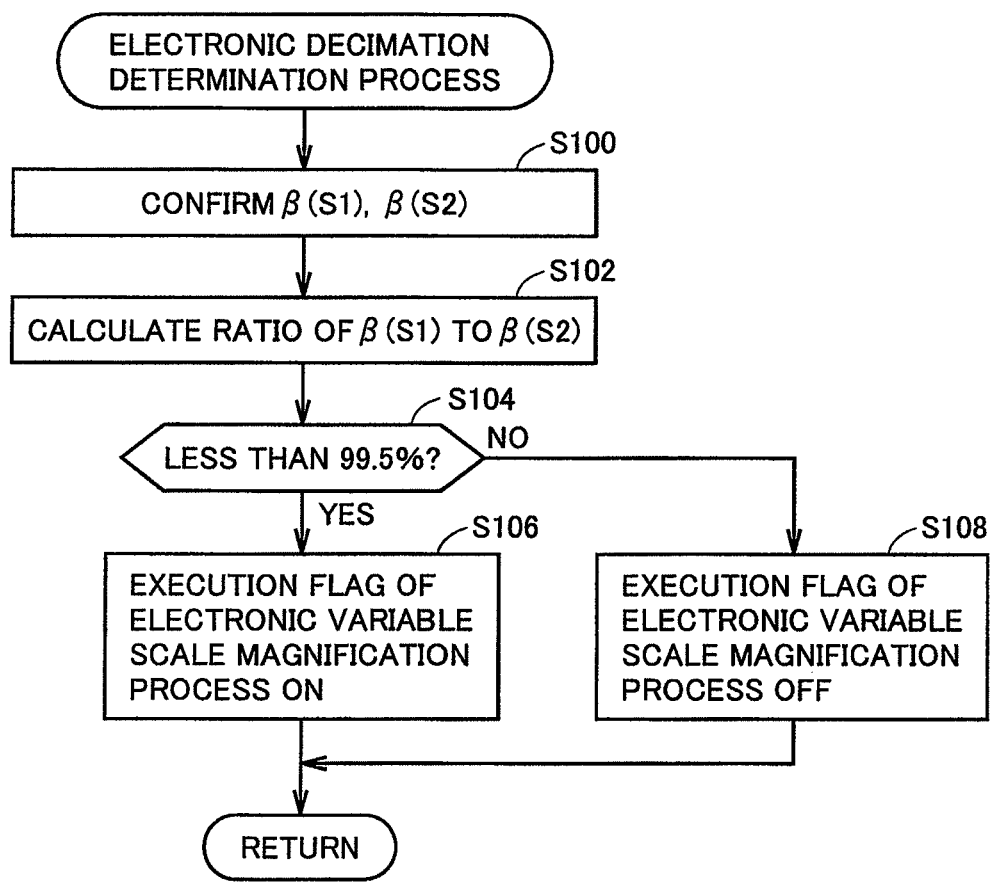
FIG. 22 is a diagram for describing an electronic decimation determination process according to the second modification of an embodiment of the present invention.

Referring to FIG. 22, first the top side subscanning correction coefficient 13 (S1) and back side subscanning correction coefficient β (S2) are confirmed (step S100).

Then, the ratio of the top side subscanning correction coefficient β (S1) to the back side subscanning correction coefficient β (S2) is calculated (step S102).

Then, a determination is made whether the multiplied value is less than 99.5% or not (step S104).

When a determination is made that the multiplied value is less than 99.5% (YES at step S104), control proceeds to step S106 to set the execution flag of an electronic variable scale magnification process (decimation process) in the subscanning direction of a top side scanned image ON. Then, the process ends (return).

When a determination is made that the multiplied value is not less than 99.5% (NO at step S104), the execution flag of an electronic variable scale magnification process (decimation process) in the subscanning direction of a top side scanned image is set OFF (step S108). Then, the process ends (return)

Returning to FIG. 22, a process of setting the expand/shrink rate of electronic variable scale magnification based on the top side subscanning magnification correction value at step S98 in response to the ON/OFF of the electronic variable scale magnification process (decimation process) execution flag is executed. Namely, when the electronic variable scale magnification process (decimation process) execution flag is OFF, the process of setting the expand/shrink rate of electronic variable scale magnification is not executed. When the electronic variable scale magnification process (decimation process) execution flag is ON, the expand/shrink rate of variable scale magnification in the subscanning direction of the top side is set to the top side subscanning magnification correction value.

The ratio of top side subscanning correction coefficient β (S1) to back side subscanning correction coefficient β (S2) will be described based on FIG. 23.

In FIG. 23, the region lower than the bold line is represented as the region where the ratio of top side subscanning correction coefficient β (S1) to back side subscanning correction coefficient β (S2) is less than 99.5%.

As indicated by equation (22) calculating a top side subscanning magnification correction value, the top side subscanning magnification correction value depends on the ratio of top side subscanning correction coefficient β (S1) to back side subscanning correction coefficient β (S2).

Top side subscanning magnification correction value= (subscanning set magnification)×(top side subscanning correction coefficient β(S1))÷(back side subscanning correction coefficient β(S2))  (22)

Therefore, in the case of top side subscanning correction coefficient β (51)/back side subscanning correction coefficient β (S2)≈1, top side subscanning magnification correction value≈ subscanning set magnification is established.

In other words, correction of the subscanning magnification in the subscanning direction is not required for a top side scanned image.

In contrast, in the case where the relationship of back side subscanning correction coefficient β (S2)≥top side subscanning correction coefficient β (S1), the top side subscanning magnification correction value becomes smaller as a function of a smaller ratio of top side subscanning correction coefficient β (S1) to back side subscanning correction coefficient β (S2). In other words, correction of scanning magnification in the subscanning direction is required for top side scanned image.

In the present example, the threshold value of the ratio of top side subscanning correction coefficient β (S1) to back side subscanning correction coefficient β (S2) that is the determination reference of an electronic variable scale magnification process (decimation process) in the subscanning direction related to a top side scanned image is set at 99.5%, by way of example.

In the case where the ratio of top side subscanning correction coefficient 13 (S1) to back side subscanning correction coefficient β (S2) is small, i.e. the difference in the scanning magnification caused by machinery difference variation between a top side scanned image and back side scanned image is great, an electronic variable scale magnification (decimation process) is to be executed. In contrast, in the case where the ratio of top side subscanning correction coefficient β (S1) to back side subscanning correction coefficient β (S2) is greater than or equal to 99.5%, i.e. the difference in the scanning magnification caused by machinery difference variation between a top side scanned image and back side scanned image is small, an electronic variable scale magnification process (decimation process) is not to be executed.

By the present system, the picture quality precision can be given priority by the setting of not executing an electronic decimation process when the difference in the scanning magnification between top side scanned image and back side scanned image is small.

In this case, there is a possibility that the length of the document of the top side will slightly become larger than that of the back side in the top side scanned image since an electronic variable scale magnification (decimation process) is not executed. Although there is a possibility that scanned image stored in memory 90 may differ in size, the region exceeding the size of the data amount of the scanned image stored in memory 90 will be neglected as not being input. The size can be adjusted by the relevant scheme.

The present example was described based on the case where the multiplied value is less than 99.5%. The value can be set to another numeric.

A method of executing control described above in the flowcharts by operating a computer or a program implementing the method can also be provided. This program can be stored in a computer-readable recording medium that is non-transitory such as a flexible disk associated with a computer, a CD-ROM (Compact Disk-Read Only), ROM (Read Only Memory), RAM (Random Access Memory), a memory card, and the like. Alternatively, the program can be recorded in a storage medium such as a hard disk embedded in a computer to be provided. Further, the program can be provided by downloading via a network.

The program may be a required one of program modules presented as a part of an operation system (OS) of a computer, which is read out in a predetermined sequence at a predetermined timing for execution of the process. In this case, the above-described module is not included in the program per se, and the process is executed in cooperation with the OS. Such a program not including a module is encompassed in the program of the present invention.

Further, the program of the present invention may be incorporated as a portion of another program to be provided. In this case, the program per se does not include the module included in the another program, and the process is executed in cooperation with another program. Such a program incorporated in another program is encompassed in the program of the present invention.

The presented program product is installed in a program storage unit such as a hard disk for execution. The program product includes the program per se, and a recording medium in which the program is recorded.

Although the present invention has been described and illustrated in detail, it is clearly understood that the same is by way of illustration and example only and is not to be taken by way of limitation, the scope of the present invention being interpreted by the terms of the appended claims.

What is claimed is:

1. An image scanning device comprising:
  a first scanner scanning a top side of a transported document at a first scanning position to obtain a first scanned image,
  a second scanner scanning a back side of said transported document at a second scanning position to obtain a second scanned image, said second scanning position arranged downstream of said first scanning position in the document transportation direction,
  a document feeder transporting said document at said second scanning position at a speed higher than the transportation speed at said first scanning position, and
  a controller controlling said image scanning device,
  said controller configured to
  set, as a scanning form of said document, one-side scanning of scanning one side of a document through one transportation, or dual-side scanning of scanning both sides of a document through one transportation,
  obtain a set magnification,
  determine the transportation speed of said document feeder such that, when said one-side scanning is set, the scanning magnification in a first direction corresponding to a transportation direction of said document attains said set magnification at said first scanned image, and when said dual-side scanning is set, the scanning magnification in said first direction attains said set magnification at said second scanned image, and execute electronic decimation on said first scanned image such that, when said dual-side scanning is set, the scanning size of said first scanned image is equal to the scanning size of said second scanned image in said first direction.

2. The image scanning device according to claim 1, wherein said document feeder includes at least
a first transportation roller arranged upstream of said first scanning position in the document transportation direction, and
a second transportation roller arranged downstream of said first scanning position in the document transportation direction,
the document transportation speed by said second transportation roller is higher than the document transportation speed by said first transportation roller.

3. The image scanning device according to claim 1, wherein said controller is configured to determine the transportation speed of said document feeder such that; when said dual-side scanning is set, said scanning magnification in said first direction at said second scanned image that varies due to a difference in said document transportation speed between said first scanning position by said first scanner and said second scanning position by said second scanner attains said set magnification.

4. The image scanning device according to claim 1, wherein said first scanner is a charge coupled device and said second scanner is a contact image sensor.

5. An image scanning device comprising:
a first scanner scanning a top side of a transported document at a first scanning position to obtain a first scanned image,
a second scanner scanning a back side of said transported document at a second scanning position to obtain a second scanned image,
a document feeder transporting said document at said second scanning position at a speed different from the transportation speed at said first scanning position, and
a controller controlling said image scanning device,
said controller configured to
set, as a scanning form of said document, one-side scanning of scanning one side of a document through one transportation, or dual-side scanning of scanning both sides of a document through one transportation,
obtain a set magnification, and
determine the transportation speed of said document feeder such that, when said one-side scanning is set, the scanning magnification in a first direction corresponding to a transportation direction of said document attains said set magnification at said first scanned image, and when said dual-side scanning is set, the scanning magnification in said first direction attains said set magnification at said second scanned image,
wherein a scanning period of one line in a second direction orthogonal to said first direction corresponding to said document transportation direction at said first scanner is equal to the scanning period of one line in said second direction at said second scanner.

6. An image scanning device comprising:
a first scanner scanning a top side of a transported document at a first scanning position to obtain a first scanned image,
a second scanner scanning a back side of said transported document at a second scanning position to obtain a second scanned image,
a document feeder transporting said document at said second scanning position at a speed different from the transportation speed at said first scanning position, and
a controller controlling said image scanning device,
said controller configured to
set, as a scanning form of said document, one-side scanning of scanning one side of a document through one transportation, or dual-side scanning of scanning both sides of a document through one transportation,
obtain a set magnification, and
determine the transportation speed of said document feeder such that, when said one-side scanning is set, the scanning magnification in a first direction corresponding to a transportation direction of said document attains said set magnification at said first scanned image, and when said dual-side scanning is set, the scanning magnification in said first direction attains said set magnification at said second scanned image,
wherein said document includes a plurality of types of documents differing in length in said first direction corresponding to said document transportation direction, and
said controller is configured to determine the transportation speed by said document feeder such that, when said dual-side scanning is set, said scanning magnification in said first direction at said second scanned image that varies due to each said length of a document attains said set magnification.

7. An image scanning device comprising:
a first scanner scanning a top side of a transported document at a first scanning position to obtain a first scanned image, wherein said document includes a plurality of types of documents differing in thickness,
a second scanner scanning a back side of said transported document at a second scanning position to obtain a second scanned image,
a document feeder transporting said document at said second scanning position at a speed different from the transportation speed at said first scanning position, and
a controller controlling said image scanning device,
said controller configured to
set, as a scanning form of said document, one-side scanning of scanning one side of a document through one transportation, or dual-side scanning of scanning both sides of a document through one transportation,
obtain a set magnification, and
determine the transportation speed of said document feeder such that, when' said one-side scanning is set, the scanning magnification in a first direction corresponding to a transportation direction of said document attains said set magnification at said first scanned image, and when said dual-side scanning is set, the scanning magnification in said first direction attains said set magnification at said second scanned image,
wherein said controller is configured to determine the transportation speed by said document feeder such that, when said dual-side scanning is set, said scanning magnification in said first direction at said second scanned image that varies due to each said thickness of a document attains said set magnification.

8. An image scanning device comprising:
a first scanner scanning a top side of a transported document at a first scanning position to obtain a first scanned image,
a second scanner scanning a back side of said transported document at a second scanning position to obtain a second scanned image, a document feeder transporting said document at said second scanning position at a speed different from the transportation speed at said first scanning position, and
a controller controlling said image scanning device,
said controller configured to
set, as a scanning form of said document, one-side scanning of scanning one side of a document through one transportation, or dual-side scanning of scanning both sides of a document through one transportation,
obtain a set magnification,
determine the transportation speed by said document feeder such that, when said one-side scanning is set, the scanning magnification in a first direction corresponding to a transportation direction of said document attains said set magnification at said first scanned image that varies due to machinery difference variation at said first scanner attains said set magnification, and when said dual-side scanning is set, the scanning magnification in said first direction attains said set magnification at said second scanned image that varies due to a difference in said document transportation speed between said first scanning position by said first scanner and said second scanning position by said second scanner and machinery difference variation at said second scanner attains said set magnification.

9. The image scanning device according to claim 8, wherein
said second scanning position is arranged downstream of said first scanning position in the document transportation direction,
said document feeder transport the document such that the transportation speed at said second scanning position is higher than the transportation speed at said first scanning position,
said controller is configured to execute an electronic variable scale magnification process of electronic decimation, when said dual-side scanning is set, such that the scanning magnification in said first direction attains said set magnification for said first scanned image, and
said electronic variable scale magnification process is equivalent to comparing the scanning magnification in said first direction at said first scanned image that varies due to machinery difference variation at said first scanner with said scanning magnification in said first direction at said second scanned image that varies due to a difference in said document transportation speed between said first scanning position by said first scanner and said second scanning position by said second scanner, and machinery difference variation at said second scanner, and performing said electronic decimation based on a result of comparison.

10. An image formation apparatus comprising:
an image scanning device, and
a printer capable of printing out an image obtained by said image scanning device,
said image scanning device including
a first scanner scanning a top side of a transported document at a first scanning position to obtain a first scanned image,
a second scanner scanning a back side of said transported document at a second scanning position to obtain a second scanned image, said second scanning position arranged downstream of said first scanning position in the document transportation direction,
a document feeder transporting said document at said second scanning position at a speed higher than the transportation speed at said first scanning position, and a controller controlling said image scanning device,
said controller configured to
set, as a scanning form of said document, one-side scanning of scanning one side of a document through one transportation, or dual-side scanning of scanning both sides of a document through one transportation,
obtain a set magnification,
determine the transportation speed of said document feeder such that, when said one-side scanning is set, the scanning magnification in a first direction corresponding to a transportation direction of said document attains said set magnification at said first scanned image, and when said dual-side scanning is set, the scanning magnification in said first direction attains said set magnification at said second scanned image, and
execute electronic decimation on said first scanned image such that, when said dual-side scanning is set, the scanning size of said first scanned image is equal to the scanning size of said second scanned image in said first direction.

11. An image scanning method of an image scanning device including a first scanner scanning a top side of a transported document at a first scanning position to obtain a first scanned image, a second scanner scanning a back side of said transported document at a second scanning position to obtain a second scanned image, said second scanning position arranged downstream of said first scanning position in the document transportation direction, and a document feeder transporting said document at said second scanning position at a speed higher than the transportation speed at said first scanning position, said image scanning method comprising the steps of:
accepting entry of a setting of whether a scanning form of said document is one-side scanning of scanning one side of a document through one transportation, or dual-side scanning of scanning both sides of a document through one transportation,
obtaining a set magnification, and
determining the transportation speed by said document feeder,
said step of determining the transportation speed of said document feeder including the step of determining the transportation speed by said document feeder such that
when said one-side scanning is set, the scanning magnification in a first direction corresponding to a transportation direction of said document at said first scanned image attains said set magnification,
when said dual-side scanning is set, the scanning magnification in said first direction at said second scanned image attains said set magnification, and
executing electronic decimation on said first scanned image such that, when said dual-side scanning is set, the scanning size of said first scanned image is equal to the scanning size of said second scanned image in said first direction.

12. The image scanning method according to claim 11, wherein a scanning period of one line in a second direction orthogonal to said first direction corresponding to said document transportation direction at said first scanner is equal to the scanning period of one line in said second direction at said second scanner.

13. The image scanning method according to claim 11, wherein
said document feeder includes at least
a first transportation roller arranged upstream of said first scanning position in the document transportation direction, and a second transportation roller arranged downstream of said first scanning position in the document transportation direction, the document transportation speed by said second transportation roller is higher than the document transportation speed by said first transportation roller.

14. A non-transitory computer readable recording medium of an image scanning device including a first scanner scanning a top side of a transported document at a first scanning position to obtain a first scanned image, a second scanner scanning a back side of said transported document at a second scanning position to obtain a second scanned image, said second scanning position arranged downstream of said first scanning position in the document transportation direction, and a document feeder transporting said document at said second scanning position at a speed higher than the transportation speed at said first scanning position, a control program stored in said recording medium causing said computer to execute a process including the steps of:

accepting entry of a setting of whether a scanning form of said document is one-side scanning of scanning one side of a document through one transportation, or dual-side scanning of scanning both sides of a document through one transportation, obtaining a set magnification, determining the transportation speed by said document feeder, said step of determining the transportation speed of said document feeder including the step of determining the transportation speed by said document feeder such that when said one-side scanning is set, the scanning magnification in a first direction corresponding to a transportation direction of said document at said first scanned image attains said set magnification, and when said dual-side scanning is set, the scanning magnification in said first direction at said second scanned image attains said set magnification, and performing electronic decimation on said first scanned image such that, when said dual-side scanning is set, the scanning size of said first scanned image is equal to the scanning size of said second scanned image in said first direction.

15. The recording medium according to claim 14, wherein said document feeder includes at least a first transportation roller arranged upstream of said first scanning position in the document transportation direction, and a second transportation roller arranged downstream of said first scanning position in the document transportation direction, the document transportation speed by said second transportation roller is higher than the document transportation speed by said first transportation roller.

16. A non-transitory computer readable recording medium of an image scanning device including a first scanner scanning a top side of a transported document at a first scanning position to obtain a first scanned image, a second scanner scanning a back side of said transported document at a second scanning position to, obtain a second scanned image, and a document feeder transporting said document at said second scanning position at a speed different from the transportation speed at said first scanning position, a control program stored in said recording medium causing said computer to execute a process including the steps of:

accepting entry of a setting of whether a scanning form of said document is one-side scanning of scanning one side of a document through one transportation, or dual-side scanning of scanning both sides of a document through one transportation, obtaining a set magnification, and determining the transportation speed by said document feeder, said step of determining the transportation speed of said document feeder including the step of determining the transportation speed by said document feeder such that when said one-side scanning is set, the scanning magnification in a first direction corresponding to a transportation direction of said document at said first scanned image attains said set magnification, and when said dual-side scanning is set, the scanning magnification in said first direction at said second scanned image attains said set magnification, wherein a scanning period of one line in a second direction orthogonal to said first direction corresponding to said document transportation direction at said first scanner is equal to the scanning period of one line in said second direction at said second scanner.

* * * * *